United States Patent
Chae et al.

(10) Patent No.: US 10,154,505 B2
(45) Date of Patent: Dec. 11, 2018

(54) METHOD AND APPARATUS FOR RECEIVING DATA IN COMMUNICATION SYSTEM SUPPORTING MULTIPLE INPUT MULTIPLE OUTPUT SCHEME

(71) Applicant: Samsung Electronics Co., Ltd., Gyeonggi-do (KR)

(72) Inventors: Sung-Ho Chae, Seoul (KR); Min Jang, Gyeonggi-do (KR); Cheol Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/497,007

(22) Filed: Apr. 25, 2017

(65) Prior Publication Data
US 2017/0311331 A1    Oct. 26, 2017

(30) Foreign Application Priority Data
Apr. 25, 2016   (KR) .................. 10-2016-0049868

(51) Int. Cl.
*H04W 72/08*    (2009.01)
*H04L 1/00*     (2006.01)
(Continued)

(52) U.S. Cl.
CPC ......... *H04W 72/082* (2013.01); *H04L 1/0059* (2013.01); *H04L 25/03006* (2013.01);
(Continued)

(58) Field of Classification Search
CPC ...... H04L 1/0009; H04L 5/006; H04B 7/0417
See application file for complete search history.

(56) References Cited

U.S. PATENT DOCUMENTS

| 7,508,748 B2 * | 3/2009 | Kadous ................. H04L 1/0003 370/208 |
| 9,118,518 B2 | 8/2015 | Erez et al. |
| 2012/0300828 A1 | 11/2012 | Erez et al. |

FOREIGN PATENT DOCUMENTS

JP    2012-175280 A    9/2012

OTHER PUBLICATIONS

Jiening Zhan et al., "Integer-Forcing Linear Receivers: A New Low-Complexity MIMO Architecture", 2010 IEEE 72nd Vehicular Technology Conference Fall (VTC 2010-Fall), Oct. 4, 2010, 7 pages.

(Continued)

*Primary Examiner* — Chandrahas B Patel

(57) ABSTRACT

The present disclosure relates to a pre-5th-generation (5G) or 5G communication system to be provided for supporting higher data rates beyond 4th-generation (4G) communication system such as a long term evolution (LTE). A method for receiving data includes selecting one of reception schemes, and receiving data based on the selected reception scheme, wherein the reception schemes includes a scheme of determining an integer matrix based on channel values estimated for channels, and decoding symbols received through the channels based on the determined integer matrix, and a scheme of detecting, for each channel, a sum of symbols received from each of the channels during a preset time based on integer matrixes which are determined based on each of the channel values, retransforming the sum of the symbols detected for each channel based on at least one of the integer matrixes, and decoding the retransformed sum of the symbols for each channel.

20 Claims, 16 Drawing Sheets

(51) Int. Cl.
  *H04L 25/03* (2006.01)
  *H04W 16/28* (2009.01)
  *H04B 7/0413* (2017.01)
(52) U.S. Cl.
  CPC ........... *H04W 16/28* (2013.01); *H04B 7/0413* (2013.01); *H04L 2025/0349* (2013.01); *H04L 2025/03598* (2013.01)

(56) References Cited

OTHER PUBLICATIONS

Asma Mejri et al., "Practical Implementation of Integer Forcing Linear Receivers in MIMO Channels", 2013 IEEE 78th Vehicular Technology, Jan. 6, 2014, 7 pages.
Or Ordentlich et al., "Successive Integer-Forcing and its Sum-Rate Optimality", Fifty-first Annual Allerton Conference, Oct. 2-3, 2013, (Date added to IEEE Feb. 13, 2014),13 pages.
International Search Report dated Jul. 26, 2017 in connection with International Patent Application No. PCT/KR2017/004378.
Written Opinion of the International Searching Authority dated Jul. 26, 2017 in connection with International Patent Application No. PCT/KR2017/004378.
Zhan, J., et al., "Integer-Forcing Linear Receivers," IEEE Trans Info Theory, Aug. 5, 2014, 26 pages.

* cited by examiner

METHOD AND APPARATUS FOR RECEIVING DATA IN COMMUNICATION SYSTEM SUPPORTING MULTIPLE INPUT MULTIPLE OUTPUT SCHEME

CROSS-REFERENCE TO RELATED APPLICATION AND CLAIM OF PRIORITY

The present application is related to and claims the priority under the priority under 35 U.S.C. § 119(a) of a Korean patent application No. 10-2016-0049868 filed on Apr. 25, 2016 in the Korean Intellectual Property Office, the entire disclosure of which is incorporated herein by reference.

TECHNICAL FIELD

The present disclosure relates to a method and apparatus for receiving data in a communication system supporting a multiple input multiple output (MIMO) scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Recently, study for increasing a frequency efficiency and a data rate has actively progressed as data traffic has been explosively increased. A MIMO scheme is a scheme in which a plurality of data streams can be transmitted at once using a plurality of transmission antennas and a plurality of reception antennas, and has an advantage of increasing a data rate proportionally to the number of antennas.

Meanwhile, a linear scheme such as a zero-forcing (ZF) method, a minimum mean squared error (MMSE) method, and/or the like and a non-linear scheme such as a maximum likelihood (ML) estimating method, a sphere decoding method, and/or the like have been proposed as a general MIMO transmitting/receiving method.

The non-linear scheme has relatively good performance and a high complexity. More particularly, if the number of antennas is increased, complexity of the non-linear scheme is exponentially increased.

Further, complexity of the linear scheme is low than the complexity of the non-linear scheme, but performance of the linear scheme is bad than performance of the non-linear scheme.

For overcoming a weakness of existing schemes such as the linear scheme and the non-linear scheme, an integer forcing (IF) scheme of which complexity is similar to complexity according to an existing linear scheme and performance is similar to performance of a non-linear scheme, e.g., an ML estimating method which provides optimal performance has been proposed.

Unlike existing schemes, the IF scheme is a scheme of decoding a sum of codewords based on a fact that a modular sum of linear codes becomes another code. If the IF scheme is used, a noise amplification issue which occurs when existing linear schemes are used can be prevented. Here, the noise amplification issue can be, for example, a noise amplification issue which occurs when a multiple stream is de-multiplexed.

The IF scheme has been proposed assuming a case that a channel is not changed according to a time and symbols of codewords transmitted through each antenna are transmitted on the same channel, so it may be difficult to apply the IF scheme to an actual channel environment.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to propose an apparatus and method for receiving data in a communication system supporting a MIMO scheme.

Another aspect of the present disclosure is to propose an apparatus and method for receiving data based on an IF scheme in a communication system supporting a MIMO scheme.

Another aspect of the present disclosure is to propose an apparatus and method for receiving data based on a reception scheme which is adaptively selected in a communication system supporting a MIMO scheme.

Another aspect of the present disclosure is to propose an apparatus and method for receiving data based on channel change amount in a communication system supporting a MIMO scheme.

In accordance with an aspect of the present disclosure, a method for receiving data by a receiving apparatus in a communication system supporting a multiple input multiple output (MIMO) scheme is provided. The method includes selecting one of a plurality of reception schemes; and receiving data based on the selected reception scheme, wherein the plurality of reception schemes includes a first integer forcing (IF) scheme and a second IF scheme, wherein the first IF scheme includes a scheme of determining an integer matrix based on channel values estimated for a plurality of channels, and decoding symbols received through the plurality of channels based on the determined integer matrix, and wherein the second IF scheme includes a scheme of detecting, for each channel, a sum of symbols received from each of the plurality of channels during a preset time based on integer matrixes which are determined based on each of the channel values, retransforming the sum of the symbols detected for each channel based on at least one of the integer matrixes, and decoding the retransformed sum of the symbols for each channel.

In accordance with another aspect of the present disclosure, a receiving apparatus in a communication system supporting a multiple input multiple output (MIMO) scheme is provided. The receiving apparatus includes a receiver; and a processor for selecting one of a plurality of reception schemes, and controlling the receiver to receive data based on the selected reception scheme, wherein the plurality of reception schemes includes a first integer forcing (IF) scheme and a second IF scheme, wherein the first IF scheme includes a scheme of determining an integer matrix based on channel values estimated for a plurality of channels, and decoding symbols received through the plurality of channels based on the determined integer matrix, and wherein the second IF scheme includes a scheme of detecting, for each channel, a sum of symbols received from each of the plurality of channels during a preset time based on integer matrixes which are determined based on each of the channel values, retransforming the sum of the symbols detected for each channel based on at least one of the integer matrixes, and decoding the retransformed sum of the symbols for each channel.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
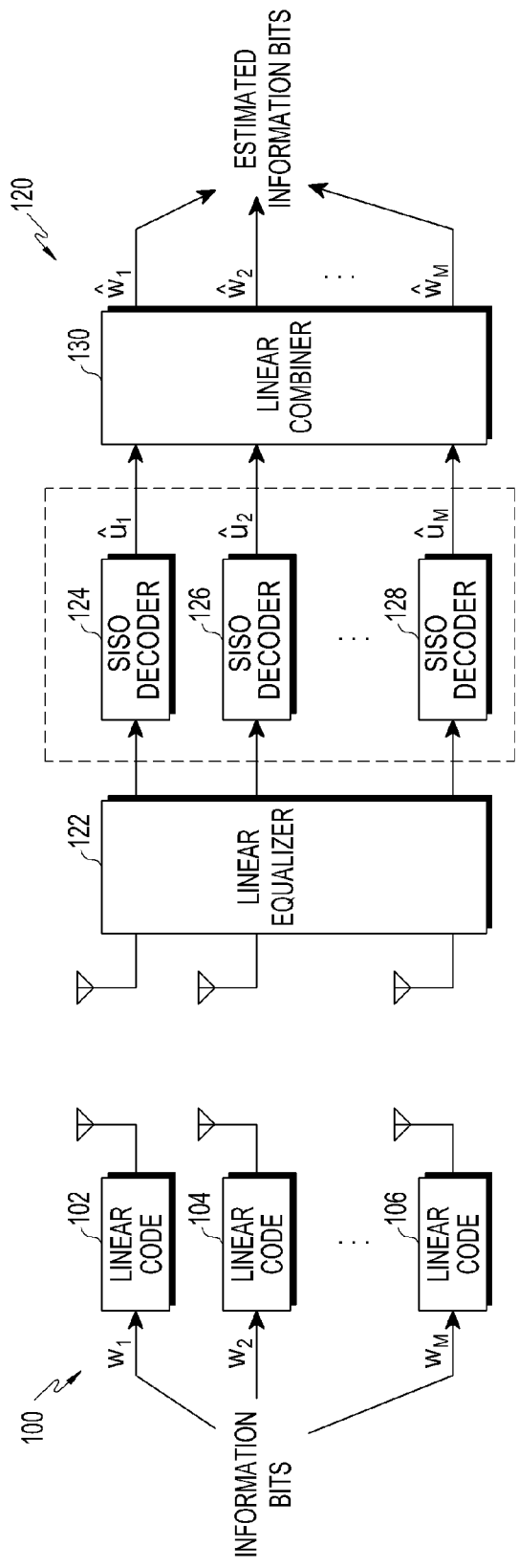
FIG. 1 schematically illustrates a general wireless communication system where an IF scheme is used.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device can be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device can be any combination of the foregoing devices. In addition, it will be apparent to one having ordinary skill in the art that an electronic device according to various embodiments of the present disclosure is not limited to the foregoing devices.

According to various embodiments of the present disclosure, a transmitting apparatus or a receiving apparatus can be, for example, a mobile station (MS). The term MS can be interchangeable with the term user equipment (UE), device, subscriber station, and/or the like.

According to various embodiments of the present disclosure, a transmitting apparatus or a receiving apparatus can be, for example, a base station (BS). The term BS can be interchangeable with the term node B, evolved node B (eNB), evolved universal terrestrial radio access network (E-UTRAN) node B (E-UTRAN node B), access point (AP), and/or the like.

An embodiment of the present disclosure proposes an apparatus and method for receiving data in a communication system supporting a multiple-input multiple-output (MIMO) scheme.

Firstly, a general integer forcing (IF) scheme will be described below to facilitate understanding of an embodiment of the present disclosure.

Firstly, it will be considered that a channel coefficient includes integer coefficients as expressed in Equation (1), and each antenna uses a linear code.

$$\begin{bmatrix} y_1 \\ y_2 \end{bmatrix} = \begin{bmatrix} 2 & 1 \\ 1 & 1 \end{bmatrix} \begin{bmatrix} x_1 \\ x_2 \end{bmatrix} + \begin{bmatrix} z_1 \\ z_2 \end{bmatrix} \quad \text{Equation (1)}$$

In Equation (1), $x_1$ denotes a data stream transmitted through the first transmission antenna, $x_2$ denotes a data stream transmitted through the second transmission antenna, $y_1$ denotes a data stream received through the first reception antenna, $y_2$ denotes a data stream received through the second reception antenna, $z_1$ denotes a noise received through the first reception antenna, $z_2$ denotes a noise received through the second reception antenna, and $$\begin{bmatrix} 2 & 1 \\ 1 & 1 \end{bmatrix}$$

denotes a channel coefficient.

In a case that a zero forcing (ZF) scheme as an existing linear scheme is used, a channel inversion matrix is multiplied by received data streams thereby transmission data streams can be estimated as expressed in Equation (2), and the estimated transmission data streams can be decoded through a single input single output (SISO) decoder.

However, in a case that the ZF scheme is used, in a channel inversing process, noise variance is increased two times and five times, respectively, so a signal to noise ratio (SNR) loss of 3 dB and 7 dB occurs compared to a parallel SISO scheme.

$$\begin{bmatrix} 1 & -1 \\ -1 & 2 \end{bmatrix} \begin{bmatrix} y_1 \\ y_2 \end{bmatrix} = \begin{bmatrix} x_1 \\ x_2 \end{bmatrix} + \begin{bmatrix} z_1 - z_2 \\ -z_1 + 2z_2 \end{bmatrix} \quad \text{Equation (2)}$$

Equation (2) is an equation indicating that a noise is amplified after a channel inversing process if the ZF scheme is used. In Equation (2), $$\begin{bmatrix} 1 & -1 \\ -1 & 2 \end{bmatrix}$$

denotes an inverse matrix of a channel coefficient, i.e., a ZF filter, and $$\begin{bmatrix} z_1 - z_2 \\ -z_1 + 2z_2 \end{bmatrix}$$

denotes an effective noise acquired after the ZF filter is applied.

If an IF scheme is used, sums of codewords $2X_1+X_2$ and $X_1+X_2$ are directly decoded based on a fact that a sum of codewords indicates other codeword without a channel inversing process thereby $\hat{u}_1, \hat{u}_2$ are generated. Thereafter, a linear equation as expressed in Equation (3) can be used for decoding an original data stream $X_1, X_2$.

In Equation (3), $\hat{x}_1$ denotes a codeword decoded corresponding to the first reception antenna, and $\hat{x}_2$ denotes a codeword decoded corresponding to the second reception antenna.

$$\begin{bmatrix} 1 & -1 \\ -1 & 2 \end{bmatrix} \begin{bmatrix} \hat{u}_1 \\ \hat{u}_2 \end{bmatrix} = \begin{bmatrix} \hat{x}_1 \\ \hat{x}_2 \end{bmatrix} \quad \text{Equation (3)}$$

Here, it is important that a channel inversing process is performed after decoding if an IF scheme is used. So, if the IF scheme is used, the channel inversing process is performed in a situation in which there is no noise (noise free situation), so noise amplification does not occur unlike a case that a ZF scheme is used.

A general wireless communication system where an IF scheme is used will be described with reference to FIG. 1.

FIG. 1 schematically illustrates a general wireless communication system where an IF scheme is used.

Referring to FIG. 1, the wireless communication system includes a transmitting apparatus 100 and a receiving apparatus 120.

Each of the transmitting apparatus 100 and the receiving apparatus 120 includes a plurality antennas and performs a transmitting and receiving operation based on a MIMO scheme.

The transmitting apparatus 100 generates information based on the number of antennas included in the transmitting apparatus 100 to generate M bit streams $w_1, w_2, \ldots, w_M$. Here, M denotes the number of antennas included in the transmitting apparatus 100, and each of the M bit streams can include at least one information bit. The transmitting apparatus 100 multiply each of the M bit streams by a linear code which corresponds to a corresponding antenna, e.g., one of linear codes 102, 104, . . . , 106 to generate M codewords. The transmitting apparatus 100 transmits M data streams including each of the M codewords to the receiving apparatus 120.

The receiving apparatus 120 receives the M data streams through each of a plurality of antennas. The receiving apparatus 120 calculates a sum $(u_1, u_2, \ldots, u_M)$ of codewords included in the M data streams through a linear equalizer 122. The receiving apparatus 120 decodes the sum $(u_1, u_2, \ldots, u_M)$ of the codewords through each of a plurality of SISO decoders 124, 126, and 128.

Then, original codewords are extracted from a sum $(\hat{u}_1, \hat{u}_2, \ldots, \hat{u}_M)$ of the decoded codewords in a linear combiner 130 and information bits are estimated from the extracted codewords.

Meanwhile, each of channel coefficients is an integer in an example as described above, however, each of the channel coefficients can be a complex value in an actual channel.

Considering this, the receiving apparatus 120 performs the following operation:

1) The receiving apparatus 120 forces a channel H into an integer matrix A using a forcing matrix B (reception filter).

For example, in equation y'=By=Ax+(BH−A)x+z, (BH−A)x+z is treated as an effective noise, and z denotes a noise vector.

2) A sum $u_M$ of original codewords is directly decoded ($\hat{u}_M$) using a SISO decoder based on a characteristic of a linear code, e.g., a characteristic of a linear code that a linear sum of codewords becomes a codeword.

3) As expressed in Equation (4), original codewords $w_1$, $w_2$, . . . , $w_M$ are extracted from a sum $\hat{u}_M$ of decoded codewords (linear sum of codewords in which there is no noise). Here, $\hat{u}_M$ can be a linear sum of codewords in which there is no noise.

$$W = [A^{-1}U] \qquad \text{Equation (4)}$$

In Equation (4), W denotes a matrix including original codewords $[w_1, w_2, \ldots, w_M]$, $A^{-1}$ denotes an inverse matrix of an integer matrix A, and U denotes a matrix including a sum $[u_1, u_2, \ldots, u_M]$ of codewords.

A basic criterion for using the IF scheme is that an integer linear sum of codewords received through each antenna included in a receiving apparatus needs to become a codeword.

In a case that symbols included in a codeword are transmitted through the same channel in a transmitting apparatus, the basic criterion can be satisfied if a linear code is used. Alternatively, in a case that the symbols included in the codeword are transmitted through different channels, a problem can occur. This is why a sequence including received symbols does not become a codeword even though a linear code is used if channel coefficients for the symbols are different, so a decoding is impossible.

More particularly, in an actual channel, a situation that a channel is changed in a time due to a Doppler shift according to user's mobility or a channel is changed on a frequency according to delay spread due to a multipath. Specially, in a case that an orthogonal frequency division multiplexing (OFDM) scheme is used, symbols included in a codeword are arranged cross all of a frequency domain and a time domain, so there is a need for a scheme of applying an IF scheme to an actual channel situation.

In a case that an line-of-sight (LoS) component is very dominant, for example, a multipath fading is very low or there is little user's mobility, such issue will not be an important issue. Further, in a case that a channel is not changed while one codeword is transmitted even though a channel is changed, for example, in a channel which is based on a block fading channel, such issue will not be an important issue.

Meanwhile, a method of searching an optimal integer matrix A from a given channel will be described below.

1) A receiving apparatus estimates a channel H based on a pilot signal.

2) The receiving apparatus calculates a matrix Q as a cost function used for searching an integer matrix A based on the estimated channel H as expressed in Equation (5).

$$Q \triangleq I_L - H^T\left(HH^T + \frac{1}{P}I_L\right)^{-1}H \qquad \text{Equation (5)}$$

In Equation (5), L denotes the number of total antennas included in the receiving apparatus, P denotes a transmission power, $I_L$ denotes an identity matrix of L×L size, $H^T$ denotes a transpose matrix, and $\triangleq$ is a sign indicating a definition.

3) After determining the cost function Q, the receiving apparatus determines an integer matrix A based on the cost function Q. The integer matrix A is fixedly used without changing. The receiving apparatus can determine an integer matrix A which maximizes a criterion as expressed as Equation (6).

$$R_m = \frac{1}{2}\log\left(\frac{1}{a_m^T Q a_m}\right) \qquad \text{Equation (6)}$$

In Equation (6), m denotes an index of a data stream, and a value of m is one of 1, . . . , L. In Equation (6), $R_m$ denotes a data stream received through the mth antenna among L antennas, $a_m$ denotes an integer matrix A for the mth data stream, and $a_m^T$ denotes a transpose matrix of the integer matrix A for the mth data stream.

4) The receiving apparatus determines a forcing matrix B used as a reception filter based on an integer matrix A for each data stream as determined above. An optimal forcing matrix B is determined as a closed-form, and a problem does not occur in this process even though a channel is changed.

$$B_{opt} = \text{SNR}AH^T(I+\text{SNR}HH^T)^{-1} \qquad \text{Equation (7)}$$

In Equation (7), $B_{opt}$ denotes an optimal forcing matrix B, I denotes an identity matrix, A denotes an integer matrix, an SNR denotes a signal to noise ratio.

As expressed above, an optimal integer matrix A is determined based on a cost function Q for a channel H. However, even though a channel is changed in a time and/or on a frequency, or symbols included in a codeword are transmitted through different channels, a fixed integer matrix A needs to be used, so performance can be degraded.

So, an embodiment of the present disclosure proposes various methods for using the IF scheme in an environment that a channel is changed.

Concretely, an embodiment of the present disclosure proposes the following five methods.

(1) Method of determining an integer matrix A based on a representative channel value or a representative cost function (2) Method of grouping channels based on channel change amount for each symbol (3) Method of using an integer matrix A for each channel on symbol detection and using a common integer matrix A on decoding (4) Method in which a transmitting apparatus performs a channel partitioning operation to operate in a diversity mode (5) Method of equalizing a channel value for an IF scheme The five methods and apparatuses thereof will be described below.

Firstly, a method of determining an integer matrix A based on a representative channel value or a representative cost function will be described below.

In the method of determining the integer matrix A based on the representative channel value or the representative cost function, it will be assumed that a length of each codeword is given as n*modulation order, and a communication for transmitting each codeword is performed during n time slots. If a modulation scheme is, for example, a 16-quadrature amplitude modulation (QAM) scheme, a modulation order is 4. In the method of determining the integer matrix A based on the representative channel value or the representative cost function, it will be assumed that a channel is changed for symbol. In the method of determining the integer matrix A based on the representative channel value or the representative cost function, it will be assumed that channel values of channels through symbols are transmitted are indicated as H(1), H(2), . . . , H(n), a transmitting apparatus does not know channel information, and a receiving apparatus knows the channel information.

Firstly, an apparatus and method of determining an integer matrix A based on a representative channel value in a communication system supporting a MIMO scheme according to an embodiment of the present disclosure will be described below.

An inner structure of a receiving apparatus of determining an integer matrix A based on a representative channel value in a communication system supporting a MIMO scheme according to an embodiment of the present disclosure will be described with reference to FIG. 2.

Figure 2:
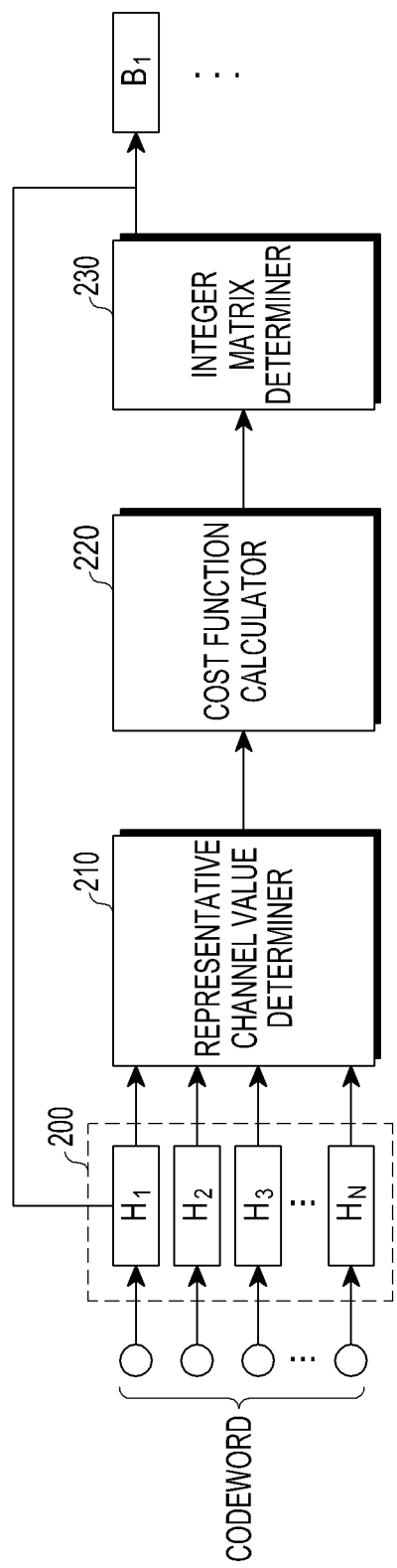
FIG. 2 schematically illustrates an inner structure of a receiving apparatus of determining an integer matrix A based on a representative channel value in a communication system supporting a MIMO scheme according to an embodiment of the present disclosure.

FIG. 2 schematically illustrates an inner structure of a receiving apparatus of determining an integer matrix A based on a representative channel value in a communication system supporting a MIMO scheme according to an embodiment of the present disclosure.

Referring to FIG. 2, a receiving apparatus includes a channel value estimator 200, a representative channel value determiner 210, a cost function calculator 220, and an integer matrix determiner 230.

Although not shown in FIG. 2, the receiving apparatus can include a plurality of antennas, at least one decoder, a linear combiner, and/or the like.

While the channel value estimator 200, the representative channel value determiner 210, the cost function calculator 220, and the integer matrix determiner 230 are described in the receiving apparatus as separate units in FIG. 2, however, the receiving apparatus can be implemented as a form that at least two of the channel value estimator 200, the representative channel value determiner 210, the cost function calculator 220, and the integer matrix determiner 230 are incorporated into a single unit.

The receiving apparatus can be implemented with at least one processor or at least one controller. There is no limitation on a form that the receiving apparatus is implemented.

The channel value estimator 200 estimates channel values H(1), H(2), . . . , H(n) of channels through symbols are transmitted based on a reference signal, e.g., a pilot signal, and/or the like, and outputs the channel values H(1), H(2), . . . , H(n) to the representative channel value determiner 210. The representative channel value determiner 210 determines H_fixed as a representative channel value based on H(1), H(2), . . . , H(n). The representative channel value determiner 210 can determine H_fixed based on various statistical schemes such as an arithmetic mean scheme, a geometric mean scheme, a weighted mean scheme, and/or the like.

For example, in a case that a channel is not significantly changed, for example, in a case that a channel is not changed so that a channel satisfies a preset threshold criterion, the representative channel value determiner 210 can determine H_fixed based on the arithmetic mean scheme. The representative channel value determiner 210 can determine H_fixed using the geometric mean scheme or the weighted mean scheme if change amount of a specific channel value is greater than preset threshold change amount, e.g., average change amount. If the weighted mean scheme is used, a method of decreasing a weight of a channel value of which change amount is relatively great, for example, a channel value of which change amount is greater than a threshold change amount can be used.

The arithmetic mean scheme, the geometric mean scheme, the weighted mean scheme will be expressed as Equation (8) to Equation (10), respectively.

$$H_{fixed} = \frac{1}{n}\sum_{i=1}^{n} H(i) \quad \text{Equation (8)}$$

Equation (8) is an equation indicating the arithmetic mean scheme. In Equation (8), $H_{fixed}$ denotes a representative channel value, and n denotes the number of total symbols.

$$h_{i,j,fixed} = \left(\sum_{i=1}^{n} h_{i,j}(i)\right)^{1/n} \forall i, j \quad \text{Equation (9)}$$

Equation (9) is an equation indicating the geometric mean scheme. In Equation (9), $H_{i,j,fixed}$ denotes a representative channel value for the (i,j) element of a channel H(i) through which the ith symbol is transmitted, and $h_{i,j}(i)$ denotes the (i,j) element of the channel H(i) which the ith symbol suffers.

$$H_{fixed} = \frac{1}{n}\sum_{i=1}^{n} \alpha(i)H(i) \quad \text{Equation (10)}$$

Equation (10) is an equation indicating the weighted mean scheme. In Equation (10), $H_{fixed}$ denotes a representative channel value, a(i) denotes a weight value corresponding to the ith channel, and $$\sum_{i=1}^{n} |\alpha(i)| = n.$$

In the weighted mean scheme, an exhaustive search method, a greedy algorithm, and/or the like can be used for searching an optimal coefficient.

The representative channel value determiner 210 can determine H_fixed based on the following method if a channel has a specific structure.

For example, the representative channel value determiner 210 can determine an LoS channel values as H_fixed if a value of a specific path estimated in the receiving apparatus is dominant (determined based on, for example, an LoS path and a first tap) or a value of an angular spread is small. In a case that a K-factor of a Rician fading is known, the representative channel value determiner 210 can determine H_fixed by adding a random value to an LoS channel value based on the K-factor of the Rician fading. Here, the representative channel value determiner 210 can add the random value to the LoS channel value based on the K-factor of the Rician fading corresponding to a predetermined scheme, and a detailed description thereof will be omitted.

After determining H_fixed, the representative channel value determiner 210 outputs H_fixed to the cost function calculator 220. The cost function calculator 220 calculates a cost function Q based on cost function calculator 220 and outputs the calculated cost function Q to the integer matrix determiner 230. The integer matrix determiner 230 determines an integer matrix A based on the cost function Q.

Meanwhile, a reception filter B can be set as expressed in Equation (11).

$$B = SNR A H^T (I + SNR(H-H_{fixed})(H-H_{fixed})^T + SNR HH^T)^{-1}$$  Equation (11)

In Equation (11), $SNR(H-H_{fixed})(H-H_{fixed})^T$ can be treated as an actual noise.

An inner structure of a receiving apparatus of determining an integer matrix A based on a representative channel value in a communication system supporting a MIMO scheme according to an embodiment of the present disclosure has been described with reference to FIG. 2, and a process of determining an integer matrix A based on a representative channel value in a receiving apparatus in a communication system supporting a MIMO scheme according to an embodiment of the present disclosure will be described with reference to FIG. 3.

Figure 3:
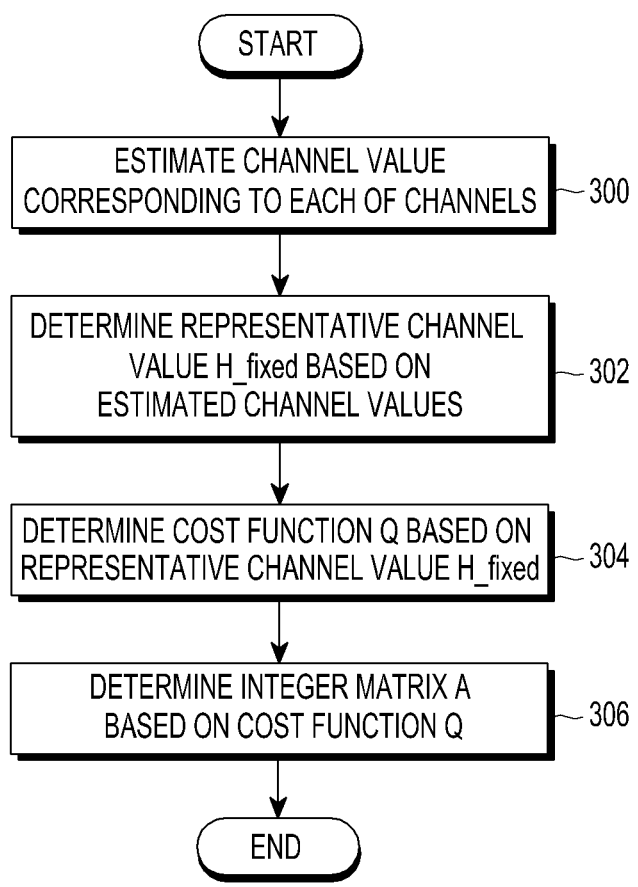
FIG. 3 schematically illustrates a process of determining an integer matrix A based on a representative channel value in a receiving apparatus in a communication system supporting a MIMO scheme according to an embodiment of the present disclosure.

FIG. 3 schematically illustrates a process of determining an integer matrix A based on a representative channel value in a receiving apparatus in a communication system supporting a MIMO scheme according to an embodiment of the present disclosure.

Referring to FIG. 3, a receiving apparatus estimates a channel value corresponding to each of channels through symbols are transmitted, e.g., H(1), H(2), . . . , H(n) at operation 300, and proceeds to operation 302. The receiving apparatus determines a representative channel value H_fixed based on the channel values estimated at operation 302 and proceeds to operation 304. For example, H_fixed can be determined based on various mean schemes for H(1), H(2), . . . , H(n).

The receiving apparatus determines a cost function Q based on the representative channel value at operation 304, and proceeds to operation 306. The receiving apparatus determines an integer matrix A based on the cost function Q at operation 306. The receiving apparatus removes a noise by forcing each channel into the integer matrix A using a reception filter B, and extracts original codewords by performing a decoding operation.

Although FIG. 3 illustrates a process of determining an integer matrix A based on a representative channel value in a receiving apparatus in a communication system supporting a MIMO scheme according to an embodiment of the present disclosure, various changes could be made to FIG. 3. For example, although shown as a series of operations, various operations in FIG. 3 could overlap, occur in parallel, occur in a different order, or occur multiple times.

An apparatus and process of determining an integer matrix A based on a representative channel value in a communication system supporting a MIMO scheme according to an embodiment of the present disclosure have been described above, and an apparatus and process of determining an integer matrix A based on a representative cost function in a communication system supporting a MIMO scheme according to an embodiment of the present disclosure will be described below.

An inner structure of a receiving apparatus of determining an integer matrix A based on a representative cost function in a communication system supporting a MIMO scheme according to an embodiment of the present disclosure will be described with reference to FIG. 4.

Figure 4:
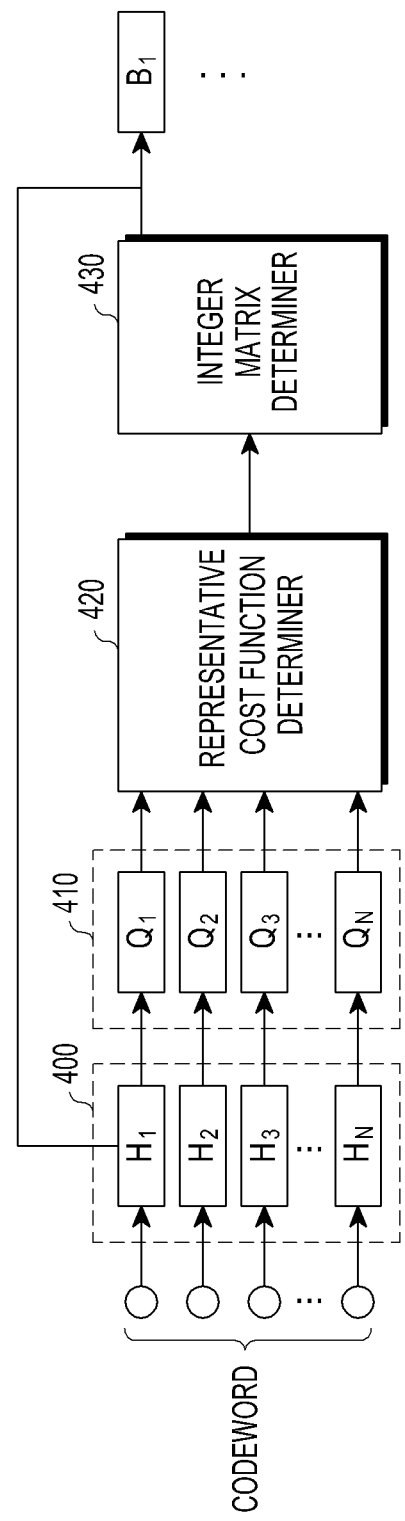
FIG. 4 schematically illustrates an inner structure of a receiving apparatus of determining an integer matrix A based on a representative cost function in a communication system supporting a MIMO scheme according to an embodiment of the present disclosure.

FIG. 4 schematically illustrates an inner structure of a receiving apparatus of determining an integer matrix A based on a representative cost function in a communication system supporting a MIMO scheme according to an embodiment of the present disclosure.

Referring to FIG. 4, a receiving apparatus includes a channel value estimator 400, a cost function calculator 410, a representative cost function determiner 420, and an integer matrix determiner 430.

Although not shown in FIG. 4, the receiving apparatus can include a plurality of antennas, at least one decoder, a linear combiner, and/or the like.

While the channel value estimator 400, the cost function calculator 410, the representative cost function determiner 420, and the integer matrix determiner 430 are described in the receiving apparatus as separate units in FIG. 4, however, the receiving apparatus can be implemented as a form that at least two of the channel value estimator 400, the cost function calculator 410, the representative cost function determiner 420, and the integer matrix determiner 430 are incorporated into a single unit.

The receiving apparatus can be implemented with at least one processor or at least one controller. There is no limitation on a form that the receiving apparatus is implemented.

The channel value estimator 400 estimates channel values H(1), H(2), . . . , H(n) of channels through symbols are transmitted based on a reference signal, e.g., a pilot signal, and/or the like, and outputs the channel values H(1), H(2), . . . , H(n) to the cost function calculator 410. The cost function calculator 410 determines a cost function Q(1), Q(2), . . . , Q(n) based on H(1), H(2), . . . , H(n). Each of Q(1), Q(2), . . . , Q(n) can be calculated based on, for example, Equation (5).

The representative cost function determiner 420 sets Q_fixed as a representative cost function based on Q(1), Q(2), . . . , Q(n). For example, the representative cost function determiner 420 can determine Q_fixed based on various statistical schemes such as an arithmetic mean scheme, a geometric mean scheme, a weighted mean scheme, and/or the like similar to a case of determining H_fixed.

The arithmetic mean scheme, the geometric mean scheme, the weighted mean scheme used for determining Q_fixed will be expressed as Equation (12) to Equation (14), respectively.

$$Q_{fixed} = \frac{1}{n}\sum_{i=1}^{n} Q(i)$$  Equation (12)

Equation (12) is an equation indicating the arithmetic mean scheme. In Equation (12), $Q_{fixed}$ denotes a representative cost function, and n denotes the number of total symbols.

$$q_{i,j,fixed} = \left(\sum_{i=1}^{n} q_{i,j}(i)\right)^{1/n} \forall i, j$$  Equation (13)

Equation (13) is an equation indicating the geometric mean scheme. In Equation (13), qi,j,fixed denotes a representative cost function for the (i,j) element of a channel H(i) through which the ith symbol is transmitted, and qi,j(i) denotes the (i,j) element of Q(t).

$$Q_{fixed} = \frac{1}{n}\sum_{i=1}^{n} \alpha(i)Q(i)$$  Equation (14)

Equation (14) is an equation indicating the weighted mean scheme. In Equation (14), $Q_{fixed}$ denotes a representative cost function, and $$\sum_{i=1}^{n} |\alpha(i)| = n.$$

After Q_fixed as a representative cost function is determined, the integer matrix determiner 430 determines an integer matrix A based on Q_fixed.

The integer matrix determiner 430 can use all of Q(1), Q(2), . . . , Q(n) instead of using Q_fixed for determining the integer matrix A. For this, the integer matrix determiner 430 can determine an integer matrix A which increases Equation (15), for example, an integer matrix A which maximizes Equation (15).

$$\sum_{i=1}^{n} \left( \frac{1}{2} \log\left( \frac{1}{a^T Q(i) a} \right) \right) \quad \text{Equation (15)}$$

A method of determining an integer matrix A using Equation (15) provides a better performance compared to a case of using Q_fixed, but calculation amount can be increased.

An inner structure of a receiving apparatus of determining an integer matrix A based on a representative cost function in a communication system supporting a MIMO scheme according to an embodiment of the present disclosure has been described with reference to FIG. 4, and a process of determining an integer matrix A based on a representative cost function in a receiving apparatus in a communication system supporting a MIMO scheme according to an embodiment of the present disclosure will be described with reference to FIG. 5.

Figure 5:
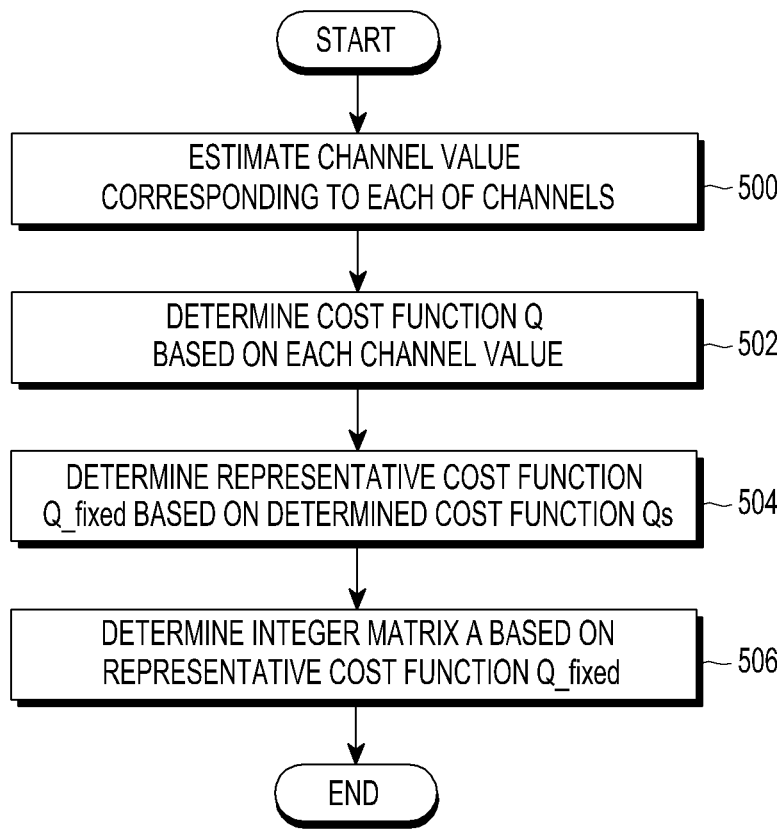
FIG. 5 schematically illustrates a process of determining an integer matrix A based on a representative cost function in a receiving apparatus in a communication system supporting a MIMO scheme according to an embodiment of the present disclosure.

FIG. 5 schematically illustrates a process of determining an integer matrix A based on a representative cost function in a receiving apparatus in a communication system supporting a MIMO scheme according to an embodiment of the present disclosure.

Referring to FIG. 5, a receiving apparatus estimates a channel value corresponding to each of channels through symbols are transmitted, e.g., H(1), H(2), . . . , H(n) at operation 500, and proceeds to operation 502. The receiving apparatus determines a cost function Q(1), Q(2), . . . , Q(n) corresponding to each channel value estimated at operation 502, and proceeds to operation 504.

The receiving apparatus determines a representative cost function Q_fixed based on the determined cost function Q(1), Q(2), . . . , Q(n) at operation 504, and proceeds to operation 506. For example, Q_fixed can be determined based on various mean schemes for Q(1), Q(2), . . . , Q(n).

The receiving apparatus determines an integer matrix A based on the representative cost function Q_fixed at operation 506.

Although FIG. 5 illustrates a process of determining an integer matrix A based on a representative cost function in a receiving apparatus in a communication system supporting a MIMO scheme according to an embodiment of the present disclosure, various changes could be made to FIG. 5. For example, although shown as a series of operations, various operations in FIG. 5 could overlap, occur in parallel, occur in a different order, or occur multiple times.

As described above, in a case that a method of determining an integer matrix A based on a representative channel value or a representative cost function is used, performance degradation is little when a difference between a channel value of each instant channel and a representative channel value is little. So, considering performance, it can be suitable that the method of determining the integer matrix A based on the representative channel value or the representative cost function is used if channel change amount is not great, for example, if channel change amount is less than preset threshold channel change amount.

In the method of determining the integer matrix A based on the representative channel value or the representative cost function, an operation of determining the integer matrix A is performed one time, so calculation amount and implementation complexity are low compared to other methods. However, a detecting operation is started after a codeword is transmitted, so a latency issue can occur.

A receiving apparatus additionally requires an operation of determining a representative channel value. If an IF/minimum mean square error (MMSE) scheme according to a degree by which a channel is changed, e.g., channel change amount is selectively used, an operation of estimating latency/Doppler spread can be added in the receiving apparatus, and an operation of transmitting a signaling can be added in a transmitting apparatus.

Secondly, a method of grouping channels based on channel change amount for each symbol will be described below.

In the method of grouping the channels based on the channel change amount for each symbol, it will be assumed that a channel is changed n_1 times (n_1<n), and a transmitting apparatus does not know a channel coefficient, but knows a situation that a channel is changed. Here, channel change amount is practically continuous, it is equal that a quantization level is set to n_1 step. The quantization level is determined based on a result of measuring channel change amount as described above. In a case of n_1=n, uncoded transmission is performed.

A transmitting apparatus of performing a method of grouping a channel based on channel change amount for each channel will be described below.

An inner structure of a transmitting apparatus of transmitting a codeword after performing channel grouping in a communication system supporting a MIMO scheme according to an embodiment of the present disclosure will be described with reference to FIG. 6A.

Figure 6A:
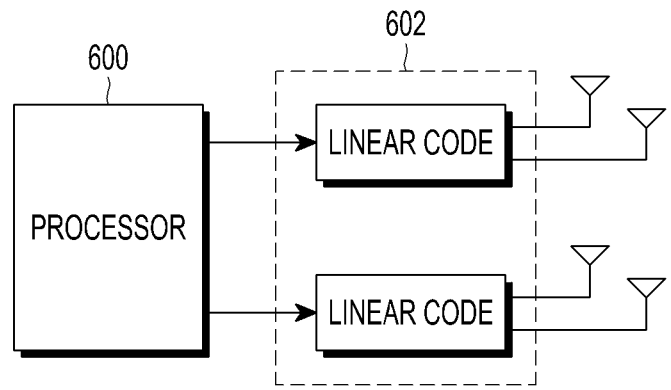
FIG. 6A schematically illustrates an inner structure of a transmitting apparatus of transmitting a codeword after performing channel grouping in a communication system supporting a MIMO scheme according to an embodiment of the present disclosure.

FIG. 6A schematically illustrates an inner structure of a transmitting apparatus of transmitting a codeword after performing channel grouping in a communication system supporting a MIMO scheme according to an embodiment of the present disclosure.

Referring to FIG. 6A, the transmitting apparatus includes a processor 600, an encoder 602, and a plurality of antennas.

The processor 600 groups channels of which channel values are similar in a time and/or on a frequency to partition channels. Here, it will be assumed that the number of channel groups is n_1. The processor 600 can perform a channel grouping operation by considering various schemes such as an arithmetic mean scheme, a geometric mean scheme, an MMSE scheme, and/or the like as described above.

After performing channel grouping operation, the processor 600 generates bits to be transmitted through antennas included in each channel group. The processor 600 controls the encoder 602 so that the bits to be transmitted is multiplied by a corresponding linear code.

The encoder 602 can include SISO encoders, and can output bits that is generated by multiplying input bits to be transmitted by a linear code as a codeword under a control of the processor 600. Here, the number of SISO decoders is equal to the number of the channel groups. Codewords output from the encoder 602 are transmitted through the plurality of antennas.

Meanwhile, the number of total codewords is Mn_1, a length of each codeword is inversely proportional to n_1. That is, the larger the number of channel groups is, the shorter a length of each codeword is, and the smaller the number of channel groups is, the longer a length of each codeword is.

Meanwhile, a receiving apparatus can receive a codeword set of each channel group, and process each codeword set by applying an IF scheme to each codeword set.

An inner structure of a transmitting apparatus of transmitting a codeword after performing channel grouping in a communication system supporting a MIMO scheme according to an embodiment of the present disclosure has been described with reference to FIG. 6A, and an example of channel grouping in a communication system supporting a MIMO scheme according to an embodiment of the present disclosure will be described with reference to FIG. 6B.

Figure 6B:
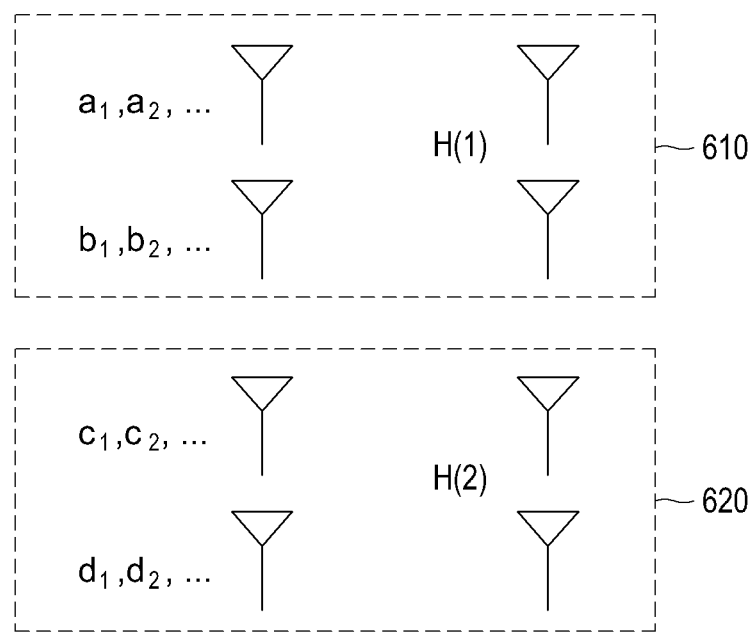
FIG. 6B schematically illustrates an example of channel grouping in a communication system supporting a MIMO scheme according to an embodiment of the present disclosure.

FIG. 6B schematically illustrates an example of channel grouping in a communication system supporting a MIMO scheme according to an embodiment of the present disclosure.

An example of channel grouping in FIG. 6B indicates a case that two channel groups, e.g., H(1) 610 and H(2) 620 are generated based on channel values. Antennas included in H(1) 610 and H(2) 620 can correspond to channels. Here, a difference among channel values of the channels and a preset channel value is less than a threshold value. The antennas included in each of H(1) 610 and H(2) 620 can transmit different codewords.

For example, the first antenna included in H(1) 610 can transmit a codeword including $a_1, a_2, \ldots$, and the second antenna included in H(1) 610 can transmit a codeword including $b_1, b_2, \ldots$. Further, the third antenna included in H(2) 620 can transmit a codeword including $c_1, c_2, \ldots$, and the fourth antenna included in H(2) 620 can transmit a codeword including $d_1, d_2, \ldots$.

In the method of grouping the channels based on the channel change amount for each symbol, there is a trade-off between a channel partitioning count and a coding gain. If the channel partitioning count is increased, for example, if a value of n_1 is increased, channel values of channels included in a channel group are more similar, so noise amplification due to a channel change is decreased, but a coding gain is decreased according that a length of a codeword is shortened, so performance can be degraded.

Alternatively, if the channel partitioning count is decreased, for example, if a value of n_1 is decreased, channel change amount of channels included in a channel group is increased, so performance can be degraded. So, it is important to appropriately determine a channel partitioning count n_1 based on a coherence time and/or a coherence bandwidth, and/or the like. Further, a separated IF scheme is used for each channel group, it is possible to apply a code of a different rate to each channel group.

Meanwhile, if channel change amount is greater than a threshold value, or channel is frequently changed, n_1 needs to be set close to n, so a case that loss is great in an aspect of a coding gain can occur. Here, a criterion of determining that the channel is frequently changed can be implemented with various forms, and a detailed description thereof will be omitted herein.

So, a method of grouping channels based on channel change amount for each symbol proposed in an embodiment of the present disclosure will be used in a channel environment satisfying a preset criterion. Here, the channel environment in which the method of grouping the channels based on the channel change amount for each symbol can be determined based on various parameters according to a situation of a communication system supporting a MIMO scheme according to an embodiment of the present disclosure, and a detailed description thereof will be omitted herein.

A process of transmitting a codeword after performing channel grouping in a transmitting apparatus in a communication system supporting a MIMO scheme according to an embodiment of the present disclosure will be described with reference to FIG. 7.

Figure 7:
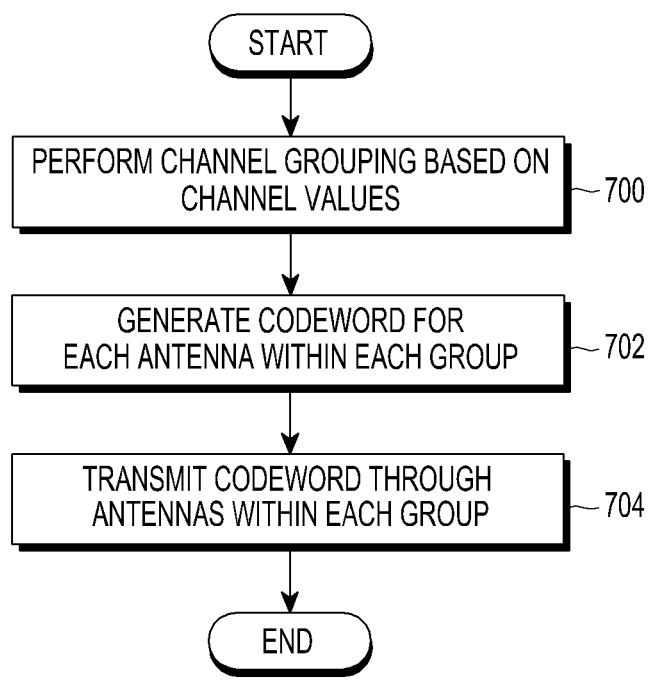
FIG. 7 schematically illustrates a process of transmitting a codeword after performing channel grouping in a transmitting apparatus in a communication system supporting a MIMO scheme according to an embodiment of the present disclosure.

FIG. 7 schematically illustrates a process of transmitting a codeword after performing channel grouping in a transmitting apparatus in a communication system supporting a MIMO scheme according to an embodiment of the present disclosure.

Referring to FIG. 7, the transmitting apparatus performs a channel grouping operation based on channel values at operation 700, and proceeds to operation 702. The transmitting apparatus generate and allocates a codeword for each of antennas included in each group at operation 702, and proceeds to operation 704. The transmitting apparatus transmits corresponding codewords through antennas included in each group at operation 704.

Although FIG. 7 illustrates a process of transmitting a codeword after performing channel grouping in a transmitting apparatus in a communication system supporting a MIMO scheme according to an embodiment of the present disclosure, various changes could be made to FIG. 7. For example, although shown as a series of operations, various operations in FIG. 7 could overlap, occur in parallel, occur in a different order, or occur multiple times.

Meanwhile, in a method of grouping channels based on channel change amount for each symbol, a transmitting apparatus needs to know a situation that a channel is changed, and a scheme of optimizing a rate for each channel group can be a key parameter for determining performance. Here, the fact that transmitting apparatus needs to know the situation that the channel is changed means that the transmitting apparatus does not need to know a value of a channel coefficient and needs to know channel change amount.

In a method of grouping channels based on channel change amount for each symbol, an integer matrix A is independently determined for each channel group, so a search space of an integer matrix A is not increased. However, in an environment where channel change amount is greater than a threshold value, for example, in an environment where a channel is relatively significantly changed, a channel partitioning count needs to be increased, so a coding gain can be decreased. The worst case is that uncoded transmission is performed. In a method of grouping channels based on channel change amount for each symbol, a coding rate and a codeword length can be changed according to a channel partitioning count, so there is a need for preparing various code sets in advance.

Thirdly, a method of using an integer matrix A for each channel on symbol detection and using a common integer matrix A on decoding will be described below.

In the method of using the integer matrix A for each channel on symbol detection and using the common integer matrix A on decoding, an optimal integer matrix A is calculated according to channel change amount, the integer matrix A is used for symbol detection, and an integer matrix A common to all symbols is used on decoding. Here, decoding means a process of estimating transmitted data based on detected symbols.

For example, if there are two different channels H(1) and H(2), a receiving apparatus can detect symbols transmitted through H(1) and H(2) based on integer matrix As A(1) and A(2) which are determined corresponding to H(1) and H(2), respectively. The receiving apparatus can commonly use A(1) which is calculated based on H(1) on decoding.

In this case, the receiving apparatus performs a sum detecting operation based on A(2) which is calculated based on H(2) as an instant channel upon detecting symbols transmitted through H(2). This can be expressed as Equation (16). Here, a sum is $$\begin{bmatrix} \hat{y}_1(2) \\ \hat{y}_2(2) \end{bmatrix}.$$

$$\begin{bmatrix} y_1(2) \\ y_2(2) \end{bmatrix} = A(2) \begin{bmatrix} x_1 & (2) \\ x_2 & (2) \end{bmatrix}, \text{ sum detection} \rightarrow \text{obtain } \begin{bmatrix} \hat{y}_1(2) \\ \hat{y}_2(2) \end{bmatrix} \quad \text{Equation (16)}$$

As expressed in Equation (17), the receiving apparatus retransforms the detected sum by multiplying the detected sum by inverse matrixes of A(1) and A(2). Here, the retransformation can be a kind of log likelihood ratio (LLR) combining.

$$\begin{bmatrix} \bar{y}_1(2) \\ \bar{y}_2(2) \end{bmatrix} = A(1)A(2)^{-1} \begin{bmatrix} \hat{y}_1(2) \\ \hat{y}_2(2) \end{bmatrix} \quad (A(1)A(2)^{-1} \text{ is deterministic fuction}) \quad \text{Equation (17)}$$

The receiving apparatus uses the retransformed sum upon decoding. That is, the receiving apparatus uses $$\begin{bmatrix} \bar{y}_1(2) \\ \bar{y}_2(2) \end{bmatrix}$$

instead of $$\begin{bmatrix} \hat{y}_1(2) \\ \hat{y}_2(2) \end{bmatrix}.$$

An inner structure of a receiving apparatus of using separate integer matrix As in a communication system supporting a MIMO scheme according to an embodiment of the present disclosure will be described with reference to FIG. 8.

Figure 8:
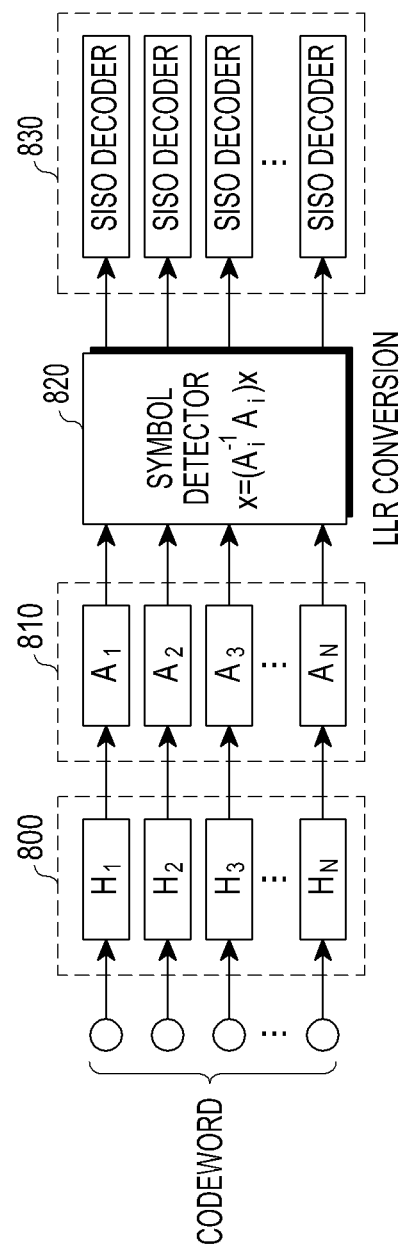
FIG. 8 schematically illustrates an inner structure of a receiving apparatus of using separate integer matrix As in a communication system supporting a MIMO scheme according to an embodiment of the present disclosure.

FIG. 8 schematically illustrates an inner structure of a receiving apparatus of using separate integer matrix As in a communication system supporting a MIMO scheme according to an embodiment of the present disclosure.

Referring to FIG. 8, a receiving apparatus includes a channel estimator 800, an integer matrix determiner 810, a symbol detector 820, and a decoder 830.

Although not shown in FIG. 8, the receiving apparatus can include a plurality of antennas, a linear combiner, and/or the like.

While the channel estimator 800, the integer matrix determiner 810, the symbol detector 820, and the decoder 830 are described in the receiving apparatus as separate units in FIG. 8, however, the receiving apparatus can be implemented as a form that at least two of the channel estimator 800, the integer matrix determiner 810, the symbol detector 820, and the decoder 830 are incorporated into a single unit.

The receiving apparatus can be implemented with at least one processor or at least one controller. There is no limitation on a form that the receiving apparatus is implemented.

The channel estimator 800 estimates channel values H(1), H(2), . . . , H(n) of channels through symbols are transmitted based on a reference signal, e.g., a pilot signal, and/or the like, and outputs H(1), H(2), . . . , H(n) to the integer matrix determiner 810. The integer matrix determiner 810 determines integer matrix As, e.g., A(1), A(2), . . . , A(n) based on H(1), H(2), . . . , H(n). The integer matrix determiner 810 can adaptively determine an integer matrix A optimal for each channel. For example, the integer matrix determiner 810 can determine an optimal integer matrix A which minimizes a noise per channel.

The symbol detector 820 uses the determined A(1), A(2), . . . , A(n) for detecting a sum of symbols for H(1), H(2), . . . , H(n), respectively. The symbol detector 820 retransforms a detected sum as expressed in Equation (17), and outputs the retransformed result to the decoder 830. The decoder 830 includes a plurality of SISO decoders, and each SISO decoder decodes the retransformed sum using A(1).

Meanwhile, the receiving apparatus determines a codeword for decoding as a codeword which the transmitting apparatus, in all probability, transmitted based on an LLR value (probability of 0 or 1) of each symbol. The operation of determining the codeword can be performed through processes as shown in Tables 1 and 2 based on a characteristic that a linear sum of codewords becomes a codeword in an IF scheme.

Figure 16:
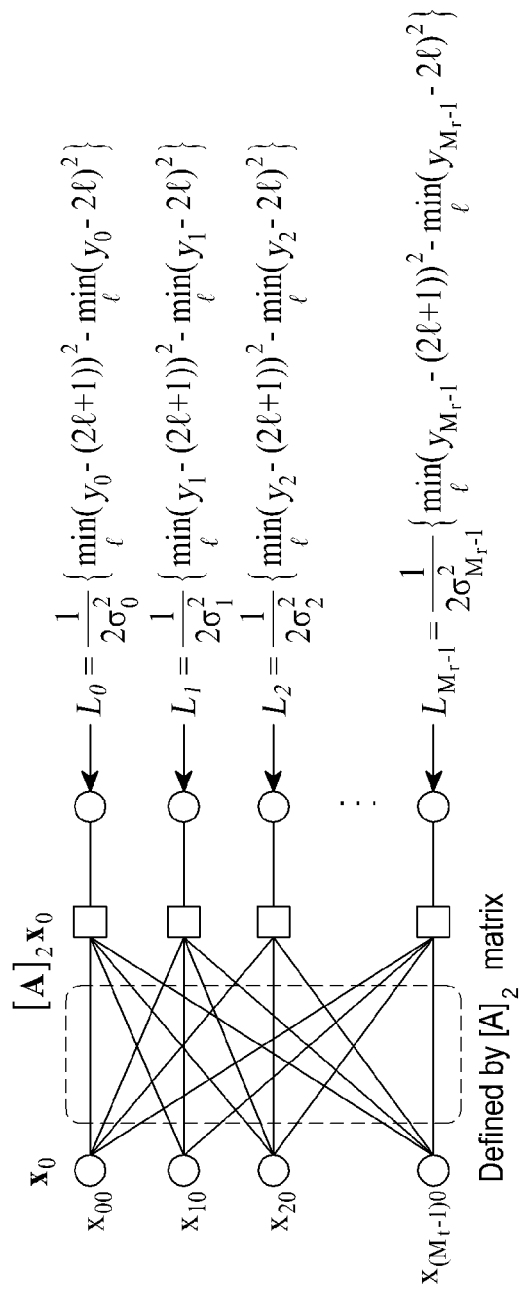
FIG. 16 illustrates Table 1 that shows a method of calculating an LLR value of a linear sum.
Figure 17:
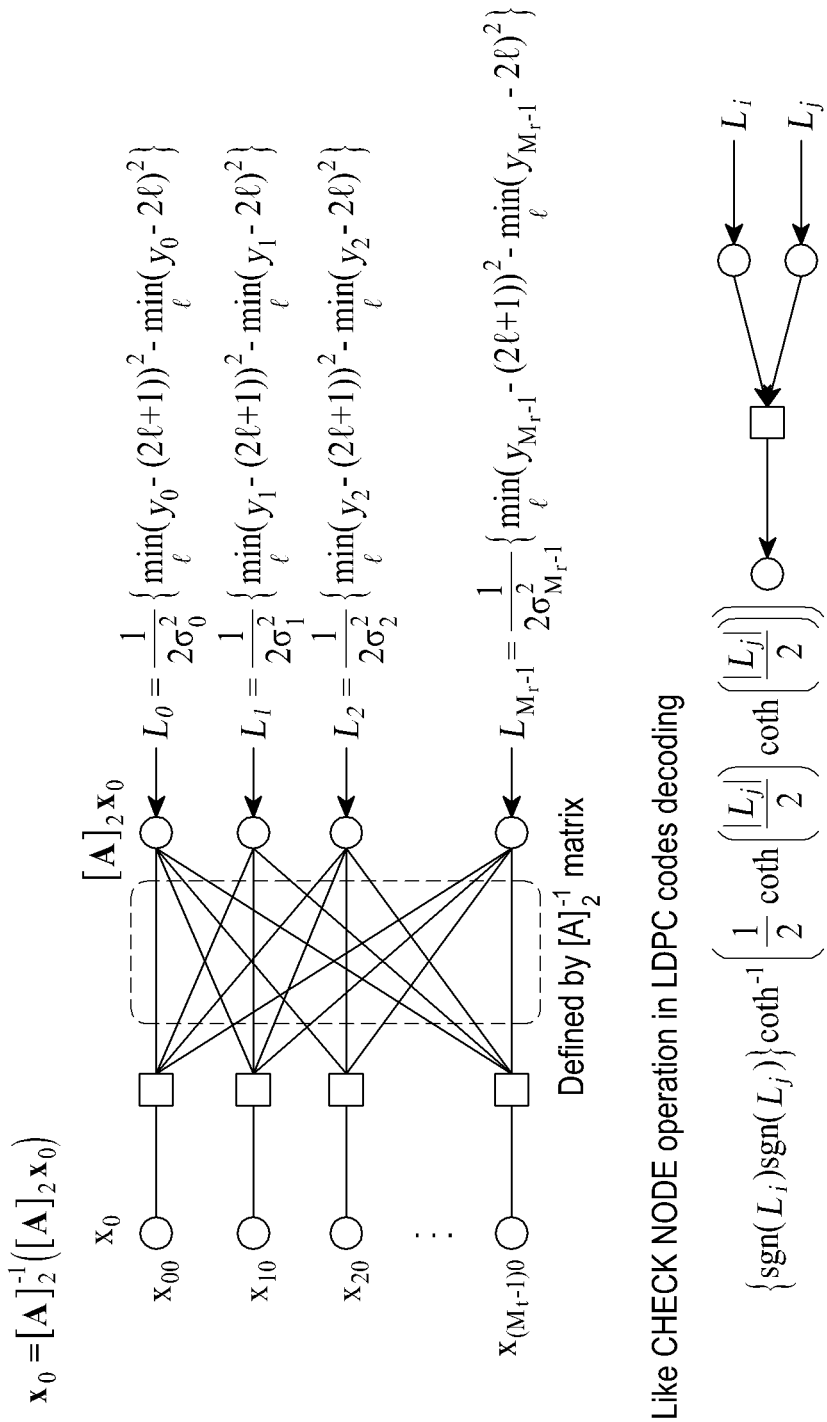
FIG. 17 illustrates Table 2 that shows a method of acquiring an LLR value by LLR conversing a result of Table 1.

FIG. 16 illustrates Table 1 that shows a method of calculating an LLR value of a linear sum $[A_2]x_0$, and FIG. 17 illustrates Table 2 that shows a method of acquiring an LLR value of $x_0$ by LLR conversing a result of Table 1, e.g., an LLR value of $[A_2]x_0$.

In Table 1, $x_0 \sim x_{M_t-1}$ denote transmission data stream vectors which correspond to the 0th to the $M_t-1$ transmission antennas, respectively, $y_0 \sim y_{M_t-1}$ denote reception data stream vectors which correspond to the 0th to the $M_t-1$ reception antennas, respectively, z denotes a noise vector of each of the 0th to the $M_t-1$ reception antennas, $L_0 \sim L_{M_t-1}$ denote LLR values calculated for the 0th to the $M_t-1$ reception antennas, respectively, Pr( ) denotes a probability, i denotes an antenna index, $y_i$ denotes a received signal received through a reception antenna i, $z_i$ denotes a noise in the reception antenna i, $L_i$ denotes an LLR value calculated in the reception antenna i (a process of determining whether a sum of codewords of a transmitted data stream is an even number or an odd number, i.e., a process of determining whether a remainder value of the sum divided by 2 is 0 or 1), $M_t$ denotes the number of transmission/reception antennas, 2l denotes an even number, 2l+1 denotes an odd number (2l and 2l+1 are used for determining whether a data stream of a reception antenna is an odd number or an even number), [ ]$_2$ denotes a modular 2 operation, and ⊗ denotes a multiplication on a modulo 2.

In Table 2, $L_i$ and $L_j$ denote LLR values calculated for the ith reception antenna and the jth antenna, and sgn( ) denotes a sign function and can be, for example, $$\text{sgn}(x) := \begin{cases} -1 & \text{if } x < 0, \\ 0 & \text{if } x = 0, \\ 1 & \text{if } x > 0, \end{cases}$$

In Table 2, coth( ) denotes a hyperbolic cotangent, and can be, for example, $$\coth_z \equiv \frac{e^z + e^{-z}}{e^z - e^{-z}} = \frac{e^{2z} + 1}{e^{2z} - 1}.$$

A process of using separate integer matrix As in a communication system supporting a MIMO scheme according to an embodiment of the present disclosure will be described with reference to FIG. 9.

Figure 9:
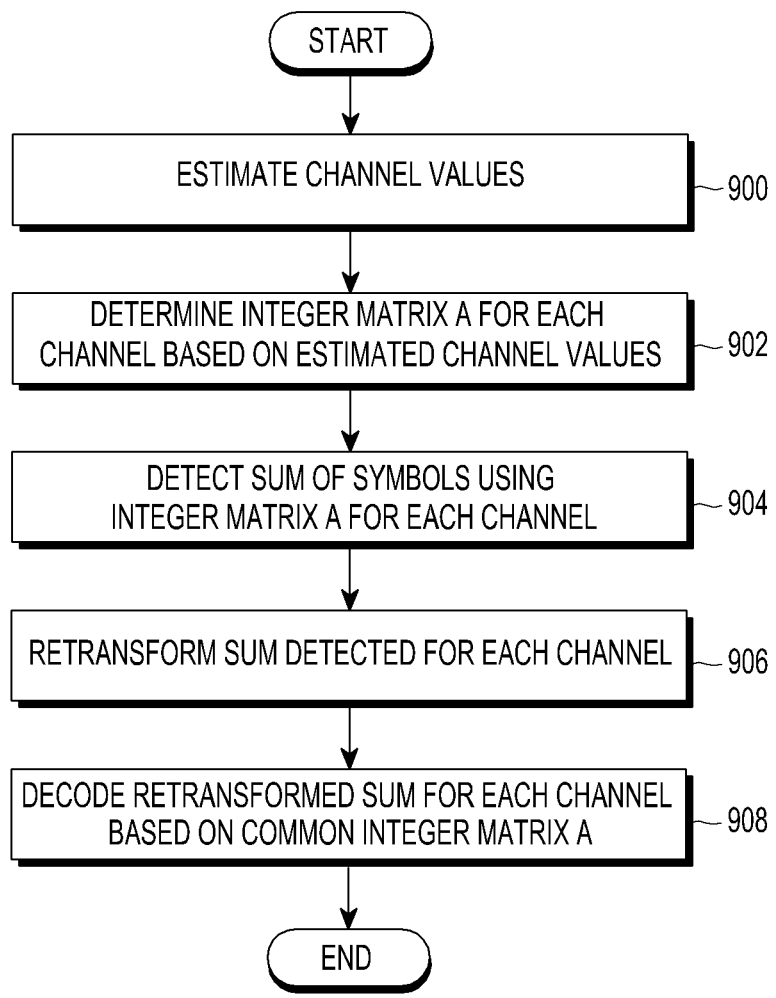
FIG. 9 schematically illustrates a process of using separate integer matrix As in a communication system supporting a MIMO scheme according to an embodiment of the present disclosure.

FIG. 9 schematically illustrates a process of using separate integer matrix As in a communication system supporting a MIMO scheme according to an embodiment of the present disclosure.

Referring to FIG. 9, a receiving apparatus estimates channel values of channels through symbols are transmitted at operation 900, and proceeds to operation 902. The receiving apparatus determines an integer matrix A for each channel based on the estimated channel values at operation 902, and proceeds to operation 904.

The receiving apparatus detects a sum of symbols using an integer matrix A determined for each channel at operation 904, and proceeds to operation 906. The receiving apparatus retransforms the sum detected for each channel at operation 906, and proceeds to operation 908. The receiving apparatus decodes the retransformed sum for each channel using one common integer matrix A at operation 908. The common integer matrix A can be one of integer matrix As including integer matrix A determined for each channel as described in FIG. 8. The common integer matrix A can be a predetermined integer matrix A, and be implemented with various forms.

Although FIG. 9 illustrates a process of using separate integer matrix As in a communication system supporting a MIMO scheme according to an embodiment of the present disclosure, various changes could be made to FIG. 9. For example, although shown as a series of operations, various operations in FIG. 9 could overlap, occur in parallel, occur in a different order, or occur multiple times.

As described above, a method of using an integer matrix A for each channel on symbol detection and using a common integer matrix A on decoding can adaptively apply an IF scheme to a channel, so the method can be the most robust in a channel change and provide best performance.

However, a method of using an integer matrix A for each channel on symbol detection and using a common integer matrix A on decoding needs to perform an operation of calculating an integer matrix A and retransforming a sum whenever a channel is changed, so computation amount can be increased. More particularly, if a channel is frequently changed, complexity can be significantly increased. Further, there is some estimation error in an actual system, so the method of using the integer matrix A for each channel upon symbol detection and using the common integer matrix A on decoding needs to be used by considering a fact that capacity loss can occur due to an operation of retransforming a sum when the sum is retransformed.

Fourthly, a method in which a transmitting apparatus operates in a diversity mode after performing a channel partitioning operation will be described below.

The method in which the transmitting apparatus operates in the diversity mode after performing the channel partitioning operation is a method in which the transmitting apparatus equally groups channels, and transmits the same data stream for each channel group thereby repetitive transmission is performed. If the number of channels is n and the number of channel groups is c, each channel group includes n/c channels. That is, in the method in which the transmitting apparatus operates in the diversity mode after performing the channel partitioning operation, a coding gain is decreased since a code length is decreased, but a diversity gain can be acquired according to repetitive transmission. Generally, if correlation between channels is less than a threshold value, increased amount of a diversity gain is greater than decreased amount of a coding gain.

In the method in which the transmitting apparatus operates in the diversity mode after performing the channel partitioning operation, data streams of which the number is less than data streams transmitted in a case that a channel is not changed are transmitted, so a multiplexing gain can be decreased if the number of channel groups. Further, each channel group transmits the same codeword, so a length of codeword to be transmitted needs to be the same for diversity combining. So, channel partitioning needs to be equally performed regardless of correlation relation between actual channel values. For example, the channel partitioning needs to be performed such that the number of channels included in each channel group is the same.

An inner structure of a transmitting apparatus of operating in a diversity mode after performing channel partitioning operation is similar to an inner structure of a transmitting apparatus as described in FIG. 6A. But, a processor included in the transmitting apparatus will be configured so that the transmitting apparatus operates in a diversity mode after performing channel partitioning operation, and an encoder will be also configured under a control of the processor so that the transmitting apparatus operates in a diversity mode after performing channel partitioning operation.

An example in which channels are equally grouped in a communication system supporting a MIMO scheme according to an embodiment of the present disclosure will be described with reference to FIG. 10.

Figure 10:
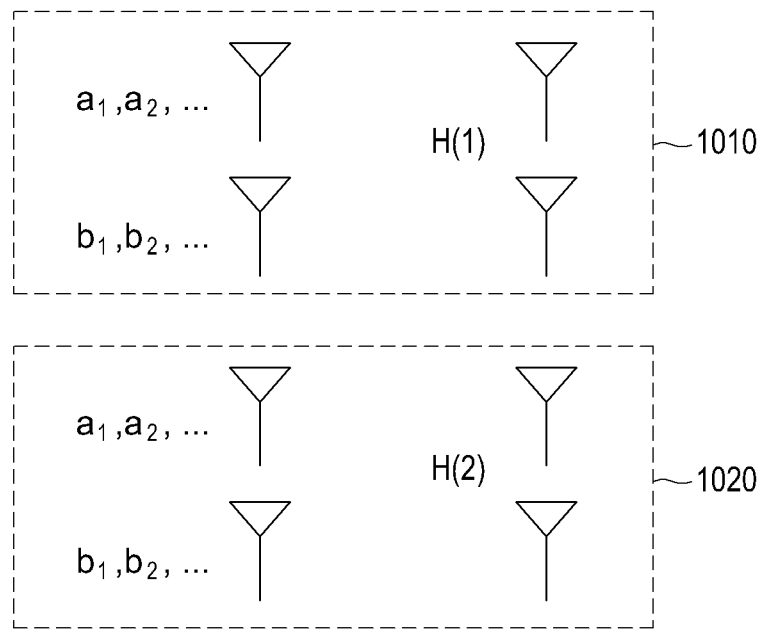
FIG. 10 schematically illustrates an example in which channels are equally grouped in a communication system supporting a MIMO scheme according to an embodiment of the present disclosure.

FIG. 10 schematically illustrates an example in which channels are equally grouped in a communication system supporting a MIMO scheme according to an embodiment of the present disclosure.

Two channel groups including the same number of channels, e.g., H(1) 1010 and H(2) 1020 are shown in FIG. 10. Antennas included in H(1) 1010 and H(2) 1020 can transmit the same codewords. For example, the third antenna and the fourth antenna included in H(2) 620 can transmit codewords identical to codewords, e.g., a codeword including $a_1$, $a_2$, . . . and a codeword including $b_1$, $b_2$, . . . transmitted by the first antenna and the second antenna included in H(1) 1010, respectively.

An example in which channels are equally grouped in a communication system supporting a MIMO scheme according to an embodiment of the present disclosure has been described with reference to FIG. 10, and an operation of a transmitting apparatus operating in a diversity mode in a communication system supporting a MIMO scheme according to an embodiment of the present disclosure will be described with reference to FIG. 11.

Figure 11:
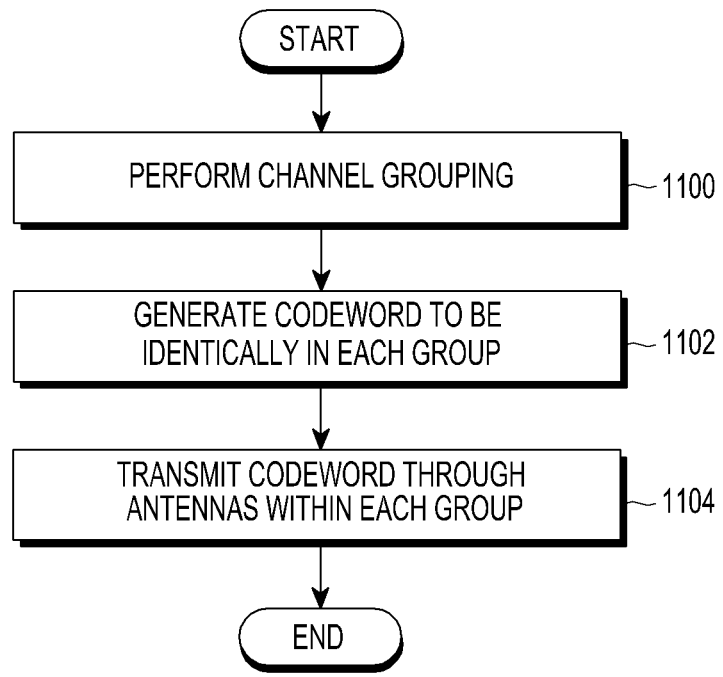
FIG. 11 schematically illustrates an operation of a transmitting apparatus operating in a diversity mode in a communication system supporting a MIMO scheme according to an embodiment of the present disclosure.

FIG. 11 schematically illustrates an operation of a transmitting apparatus operating in a diversity mode in a communication system supporting a MIMO scheme according to an embodiment of the present disclosure.

Referring to FIG. 11, the transmitting apparatus performs a channel grouping operation so that the number of channels included in each channel group is the same at operation 1100, and proceeds to operation 1102. Here, the channel grouping operation can be performed based on a channel value, and/or the like. For example, the transmitting apparatus can generate channels of which channel values are similar as one channel group.

The transmitting apparatus generates a codeword which each channel group will identically transmit at operation 1102, and proceeds to operation 1104. That is, the transmitting apparatus generates a codeword to be repetitively transmitted through a plurality of antennas included in each channel group at operation 1102, and proceeds to operation 1104. The transmitting apparatus transmits a codeword through antennas included in each channel group at operation 1104.

Although FIG. 11 illustrates an operation of a transmitting apparatus operating in a diversity mode in a communication system supporting a MIMO scheme according to an embodiment of the present disclosure, various changes could be made to FIG. 11. For example, although shown as a series of operations, various operations in FIG. 11 could overlap, occur in parallel, occur in a different order, or occur multiple times.

In the method in which the transmitting apparatus operates in the diversity mode after performing the channel partitioning operation, a transmitting apparatus needs to know a situation that a channel is changed like a method of grouping channels based on channel change amount for each symbol, and performs an operation of equally partitioning channels by considering a channel value and a repetitive transmitting operation. Here, a method of performing a channel partitioning operation and a repetitive transmitting operation can be implemented with various forms, and also performance can be varied according to the channel partitioning operation and the repetitive transmitting operation.

Fifthly, a method of equalizing a channel value for an IF scheme will be described below. The method of equalizing the channel value for the IF scheme is a method in which a transmitting apparatus identically adjusts an effective channel value of each channel by applying a pre-coding matrix of the transmitting apparatus per time slot in a case that the transmitting apparatus can know channel information based on feedback information of a receiving apparatus, and/or the like. This can be expressed as Equation (18).

$$\text{Set } H_{fixed}=H(1)P(1)=H(2)P(2)=\ldots=H(n)P(n) \quad \text{Equation (18)}$$

In Equation (18), H(1), H(2), ..., H(n) which correspond to time slots, e.g., a time slot 1, a time slot 2, ..., a time slot n denote channel values, P(1), P(2), ..., P(n) denote pre-coding matrixes which the transmitting apparatus uses corresponding to the time slot 1, the time slot 2, ..., the time slot n, and H_fixed denotes an effective channel value.

The transmitting apparatus applies a pre-coding matrix to the channel value so that an effective channel value for each time slot is the same. So, an effective channel value of a receiving apparatus is fixed to H_fixed regardless of a channel change, and the receiving apparatus can use an existing IF scheme.

If a difference between channel values which correspond to symbols is less than a threshold value, the transmitting apparatus can determine H_fixed based on a statistical mean scheme such as an arithmetic mean scheme, a geometric mean scheme, a weighted mean scheme, and/or the like, an empirical mean scheme, and/or the like. This is for satisfying a power constraint criterion of P(n).

If the difference between the channel values which correspond to the symbols is greater than the threshold value, the transmitting apparatus can set H_fixed as a value which is an integer multiple of a preset value, or can use a method in which a receiving apparatus can determine H_fixed.

For example, if a difference between H(1) and H(2) is great than or equal to a preset value, a pre-coder P(2) included in a transmitting apparatus and an inner pre-coder R(2) included on a receiving apparatus can be set so that H_fixed=H(1)P(1), and H_fixed=R(2)H(2)P(2), or cH_fixed=H(2)P(2). For example, c denotes an integer greater than 1, and H_fixed values for H(1) and H_fixed values for H(2) are the same only on a modulo.

Further, a transmitting apparatus can select P(n) from a predetermined set. Here, a quantization error can be minimized by selecting a pre-coding matrix which minimizes ||H_fixed-H(n)P(n)|| from pre-coding matrixes included in a corresponding set. An operation of a receiving apparatus which corresponds to this operation of the transmitting apparatus can be the same as an operation of a receiving apparatus which uses a general IF scheme in a case of assuming that a channel is not changed.

Meanwhile, a scheme of determining P(n) so that a cost function Q always has the same value can be used like a method of determining H_fixed, and the scheme of determining P(n) can be a form that the scheme of determining H_fixed is identically applied.

An inner structure of a transmitting apparatus of performing a method of equalizing a channel value for an IF scheme is similar to an inner structure of a transmitting apparatus as described in FIG. 6A. But, a processor included in the transmitting apparatus will be configured so that the transmitting apparatus performs the method of equalizing the channel value for the IF scheme, and an encoder will be also configured under a control of the processor so that the transmitting apparatus performs the method of equalizing the channel value for the IF scheme.

Further, a method of equalizing a channel value for an IF scheme has a constraint criterion that a transmitting apparatus needs to know a channel coefficient through feedback, and/or the like, so the transmitting apparatus can further include a receiver for receiving a feedback signal.

The transmitting apparatus can further include a calculator for calculating an average value of a channel, and/or the like for determining H_fixed, a pre-coding matrix selector for selecting an appropriate pre-coding matrix by determining a pre-coding matrix set, and/or the like. Further, the processor can perform an operation of the calculator and the pre-coding matrix selector.

A process in which a transmitting apparatus transmits a codeword after equalizing a channel value in a communication system supporting a MIMO scheme according to an embodiment of the present disclosure will be described with reference to FIG. 12.

Figure 12:
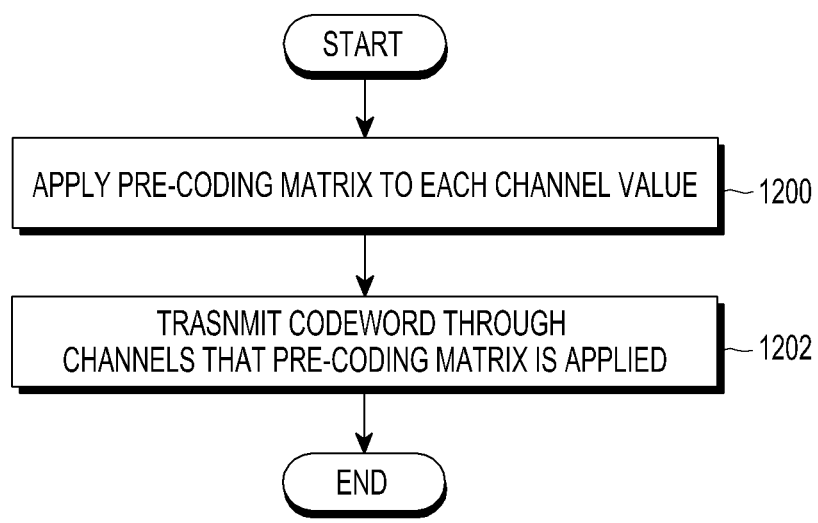
FIG. 12 schematically illustrates a process in which a transmitting apparatus transmits a codeword after equalizing a channel value in a communication system supporting a MIMO scheme according to an embodiment of the present disclosure.

FIG. 12 schematically illustrates a process in which a transmitting apparatus transmits a codeword after equalizing a channel value in a communication system supporting a MIMO scheme according to an embodiment of the present disclosure.

Referring to FIG. 12, the transmitting apparatus applies a pre-coding matrix to each channel value so that an effective value for each time slot is the same at operation 1200, and proceeds to operation 1202. The transmitting apparatus transmits a codeword through channels to which the pre-coding matrix is applied at operation 1202.

A method of determining an integer matrix A based on a representative channel value or a representative cost function, a method of using an integer matrix A for each channel on symbol detection and using a common integer matrix A on decoding, and a method of equalizing a channel value for an IF scheme among five methods proposed in an embodiment of the present disclosure can be identically applied to a case that a hybrid automatic repeat and request (HARQ) scheme is used. More particularly, there is a high probability that a channel used on the second transmission is different from a channel used on the first transmission in an HARQ operation even though a channel is static. At this time, a method of determining an integer matrix A based on a representative channel value or a representative cost function, a method of using an integer matrix A for each channel on symbol detection and using a common integer matrix A on decoding, and a method of equalizing a channel value for an IF scheme are applied, a HARQ scheme which is robust to a channel can be implemented.

Further, in an embodiment of the present disclosure, a receiving apparatus can selectively use an IF scheme or an existing scheme. The receiving apparatus knows all channels, so the receiving apparatus can selectively use an IF scheme or an existing scheme based on a result of estimating a channel similarity (or channel change amount) and an LoS component. This will be described with reference to FIG. 13.

Figure 13:
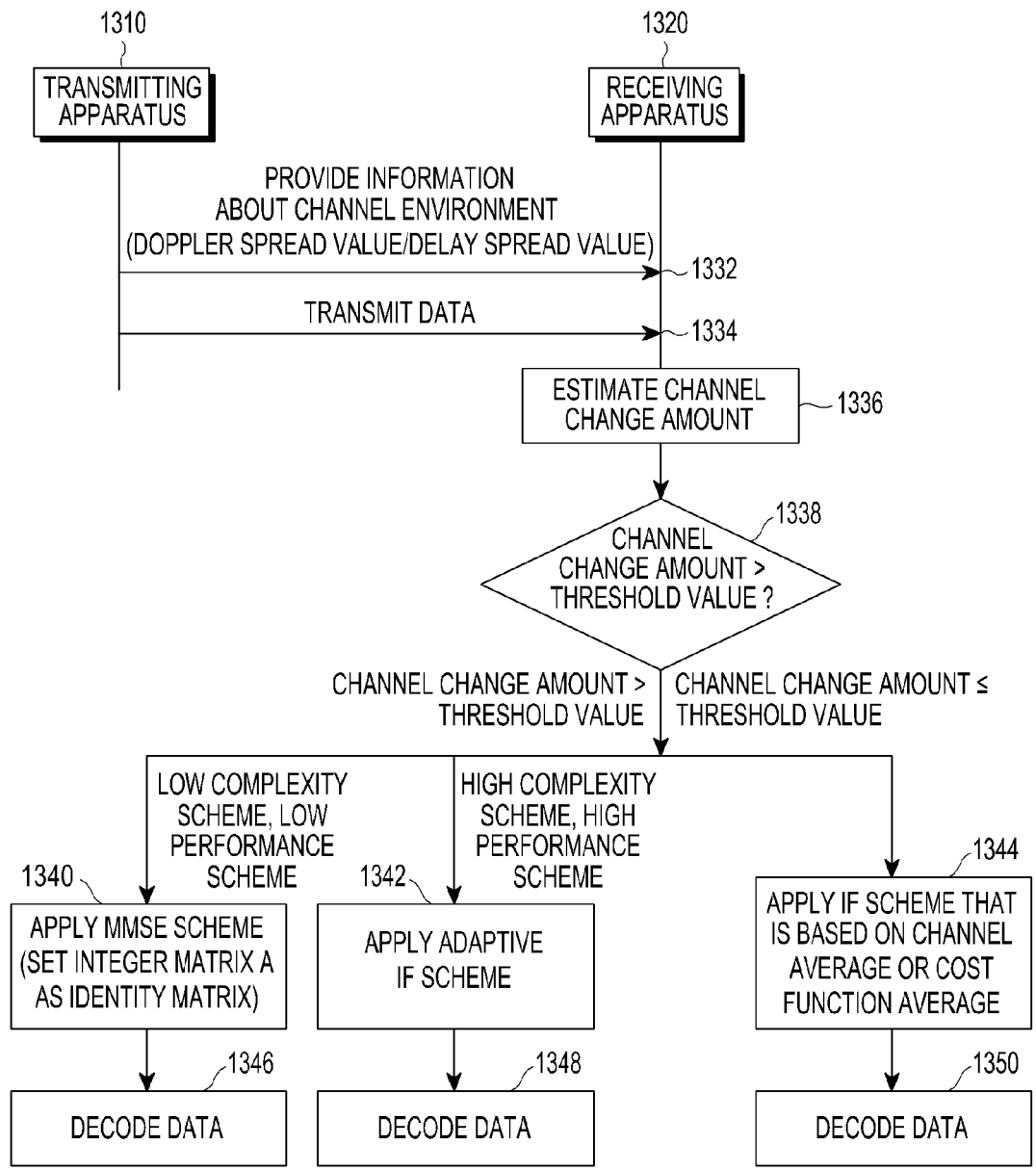
FIG. 13 schematically illustrates a process of selectively using a scheme of processing a received signal based on channel change amount in a communication system supporting a MIMO scheme according to an embodiment of the present disclosure.

FIG. 13 schematically illustrates a process of selectively using a scheme of processing a received signal based on channel change amount in a communication system supporting a MIMO scheme according to an embodiment of the present disclosure.

Referring to FIG. 13, a transmitting apparatus 1310 transmits information about a channel environment to a receiving apparatus 1320 at operation 1332. The transmitting apparatus 1310 transmits data to the receiving apparatus 1320 through a plurality of antennas at operation 1334. The information about the channel environment can include a Doppler spread value and/or a delay spread value measured in the transmitting apparatus 1310, and/or the like.

Operation 1332 and operation 1334 can be performed at the same time, or operation 1334 can be performed before operation 1332. If the receiving apparatus 1320 is capable of determining the Doppler spread value and/or the delay spread value, operation 1332 can be omitted.

The receiving apparatus 1320 estimates channel change amount at operation 1336. The receiving apparatus 1320 can estimate the channel change amount based on information provided by the transmitting apparatus 1310 at operation 1332, or can estimate the channel change amount based on the following method without using the information.

The receiving apparatus 1320 estimates a channel on a frequency domain and/or a time domain based on a channel value of each channel through symbols are transmitted through a reference signal, e.g., a pilot signal to determine a Doppler spread value and/or a delay spread value, and/or the like. The receiving apparatus 1320 can estimate the channel change amount based on the determined Doppler spread value and/or delay spread value, and/or the like.

The receiving apparatus 1320 can acquire the Doppler spread value and/or the delay spread value by determining a channel change on a time/frequency domain based on a coherence time/coherence bandwidth. The coherence time/coherence bandwidth can be determined using, for example, Equation (19).

Coherence time: $C_T = \max|t_1 - t_2| \text{ s.t. } |H(t_1, f_1) - H(t_2, f_1)| < t_{th}$ Coherence bandwidth: $C_B = \max|f_1 - f_2| \text{ s.t. } |H(t_1, f_1) - H(t_1, f_2)| < W_{th}$  Equation (19)

In Equation (19), $C_T$ denotes a coherence time, $C_B$ denotes a coherence bandwidth, $t_1$ denotes the first measurement time, $t_2$ denotes the second measurement time, $t_{th}$ denotes a threshold time, $f_1$ denotes the first measurement frequency, $f_2$ denotes the second measurement frequency, $W_{th}$ denotes a threshold bandwidth, and s.t denotes the term such that, that is, s.t means a corresponding criterion is satisfied.

The receiving apparatus 1320 can acquire the Doppler spread value and/or the delay spread value based on a channel variance value.

The receiving apparatus 1320 can estimate the channel change amount based on a Doppler shift value, and the Doppler shift value can be determined based on a result of estimating a location of the receiving apparatus 1320 based on a global positioning system (GPS), and/or the like.

After estimating the channel change amount, the receiving apparatus 1320 determines whether the channel change amount is greater than a threshold value at operation 1338. If the channel change amount is greater than the threshold value, the receiving apparatus 1320 performs one of operation 1340 and operation 1342 by considering complexity and performance. That is, the receiving apparatus 1320 can apply a general MMSE scheme (scheme with low complexity and low performance) which fixedly uses an integer matrix A as an identity matrix at operation 1340 and perform data decoding at operation 1342. The receiving apparatus 1320 can apply a channel adaptive-IF scheme, e.g., a method of using an integer matrix A for each channel on symbol detection and using a common integer matrix A on decoding (scheme with high complexity and high performance) at operation 1342, and perform data decoding at operation 1348.

If the channel change amount is less than or equal to the threshold value, the receiving apparatus 1320 can apply an IF scheme which is based on a representative channel value or a representative cost function as described above, e.g., a method of determining an integer matrix A based on a representative channel value or a representative cost function according to an embodiment of the present disclosure at operation 1344, and perform data decoding at operation 1350.

The receiving apparatus 1320 can determine an LoS component by measuring an angle of arrival (AoA). The higher an AoA component is, the stronger an LoS component is. The larger an LoS component is, the greater a performance gain according to use of an IF scheme is, compared to an existing scheme. So, a reception scheme of processing a received signal can be selected by considering a size of an LoS component and channel change amount.

For example, the receiving apparatus 1320 can select a reception scheme according to channel change status using a look up table in which a reception scheme corresponding to a size of an LoS component and channel change amount is included and use the reception scheme. The receiving apparatus 1320 can select and use an IF scheme if an LoS component is high and a channel is not significantly changed.

Although FIG. 13 illustrates a process of selectively using a scheme of processing a received signal based on channel change amount in a communication system supporting a MIMO scheme according to an embodiment of the present disclosure, various changes could be made to FIG. 13. For example, although shown as a series of operations, various operations in FIG. 13 could overlap, occur in parallel, occur in a different order, or occur multiple times.

In FIG. 13, although a receiving apparatus selectively uses a method of determining an integer matrix A based on a representative channel value or a representative cost function according to an embodiment of the present disclosure, a method of using an integer matrix A for each channel on symbol detection and using a common integer matrix A for each channel on decoding according to an embodiment of the present disclosure, and an MMSE scheme, various changes could be made to FIG. 13. For example, a receiving apparatus can selectively use one of or a combination of two of (1) a method of determining an integer matrix A based on a representative channel value or a representative cost function, (2) a method of grouping channels based on channel change amount for each symbol, (3) a method of using an integer matrix A for each channel on symbol detection and using a common integer matrix A for each channel on decoding, (4) a method in which a transmitting apparatus performs a channel partitioning operation to operate in a diversity mode, and (5) a method of equalizing a channel value for an IF scheme according to an embodiment of the present disclosure.

A process of selectively using a scheme of processing a received signal based on channel change amount in a communication system supporting a MIMO scheme according to an embodiment of the present disclosure has been described with reference to FIG. 13, and performance of a method of determining an integer matrix A based on a representative channel value or a representative cost function and performance according to an MMSE scheme in a communication system supporting a MIMO scheme according to an embodiment of the present disclosure will be described with reference to FIG. 14.

Figure 14:
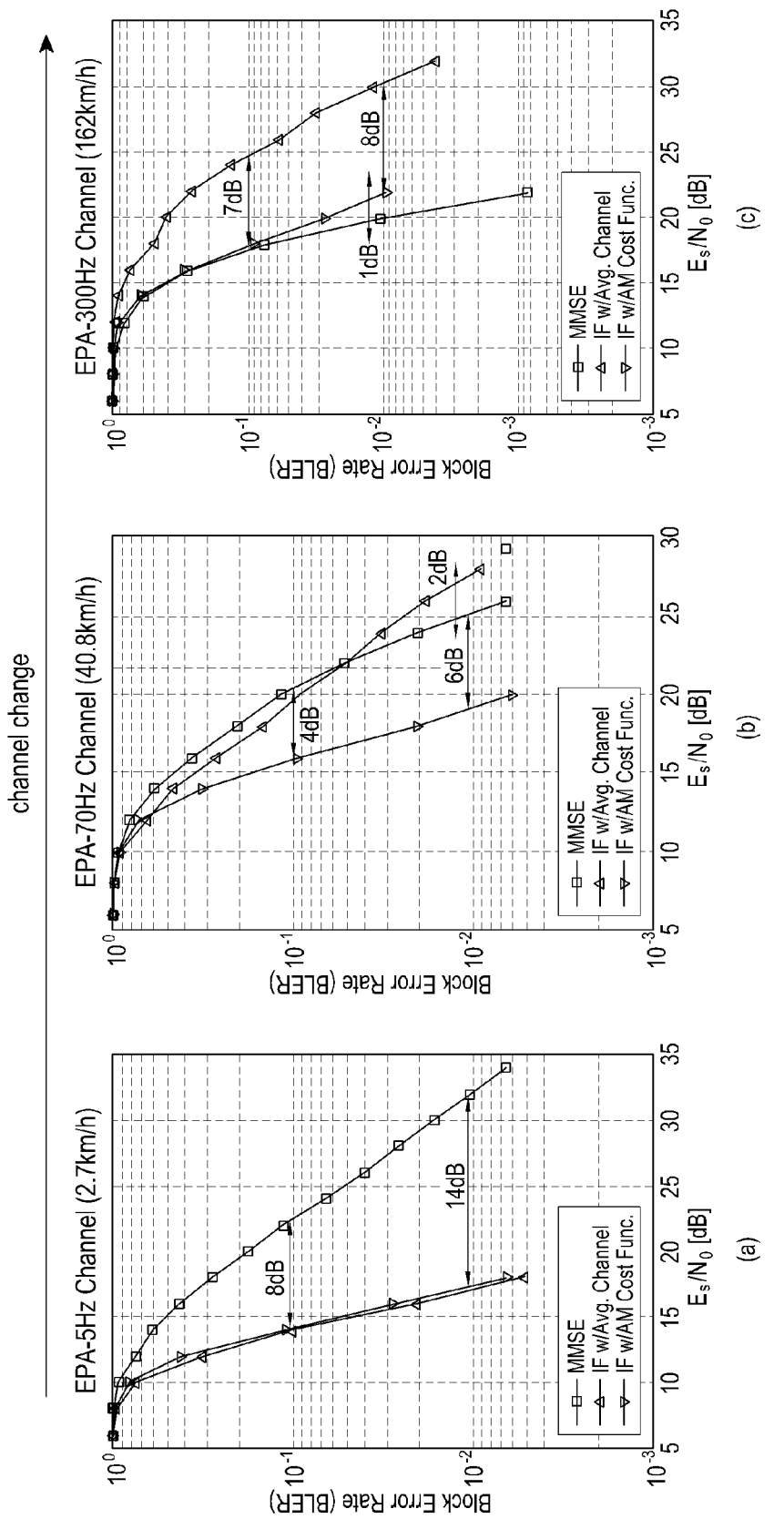
FIG. 14 is a graph illustrating performance of a method of determining an integer matrix A based on a representative channel value or a representative cost function and performance according to an MMSE scheme in a communication system supporting a MIMO scheme according to an embodiment of the present disclosure.

FIG. 14 is a graph illustrating performance of a method of determining an integer matrix A based on a representative channel value or a representative cost function and performance according to an MMSE scheme in a communication system supporting a MIMO scheme according to an embodiment of the present disclosure.

Performance for the following three methods under a condition of Rate-0.75 MLC & MSD (LDPC Coding), Channels: EPA 5 Hz, EVA 70 Hz, ETU 300 Hz Rayleigh Fading Channels (Carrier Freq.=2 GHz) is shown in FIG. 14.

In FIG. 14, performance for an MMSE scheme using an integer matrix A which is fixedly for each channel is shown as a graph labeled as "MMSE", performance for an IF scheme using an integer matrix A which is determined based on a representative channel value, e.g., a channel average value is shown as a graph labeled as "IF w/Avg. Channel", and performance for an IF scheme using an integer matrix A which is determined based on a representative cost function value, e.g., a cost function average value is shown as a graph labeled as "IF w/AM Cost Func.".

In FIG. 14, (a) indicates performance in a case that channel change is little. As shown in (a), it will be understood that the two IF schemes, i.e., a method of determining an integer matrix A based on a representative channel value and a method of determining an integer matrix A based on a representative cost function according to an embodiment of the present disclosure is better than performance of an MMSE scheme.

As shown in (b) and (c), the more increased a channel change is, the more enhanced performance of the MMSE is, compared to performance of the two IF schemes, especially, performance of an IF scheme which is based on a representative channel value. So, if a channel change is great, the MMSE scheme can be used. Alternatively, if a channel change is not great, the two IF schemes can be used.

Performance of a method of determining an integer matrix A based on a representative channel value or a representative cost function and performance according to an MMSE scheme in a communication system supporting a MIMO scheme according to an embodiment of the present disclosure has been described with reference to FIG. 14, and performance of a method of determining an integer matrix A based on a representative channel value or a representative cost function, performance of a method of using an integer matrix A for each channel on symbol detection and using a common integer matrix A on decoding, and performance according to an MMSE scheme in a communication system supporting a MIMO scheme according to an embodiment of the present disclosure will be described with reference to FIG. 15.

Figure 15:
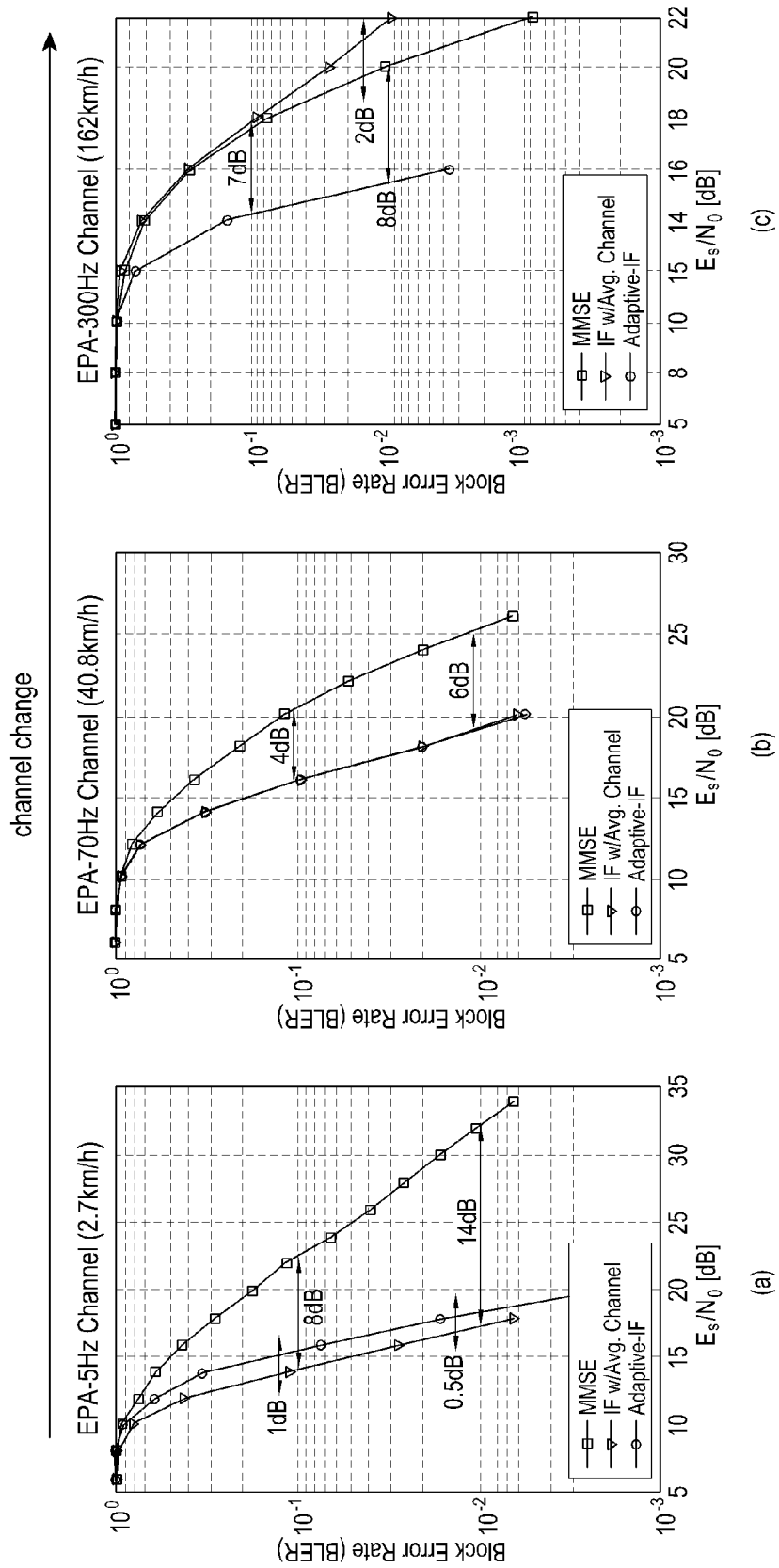
FIG. 15 is a graph illustrating performance of a method of determining an integer matrix A based on a representative channel value or a representative cost function, performance of a method of using an integer matrix A for each channel on symbol detection and using a common integer matrix A on decoding, and performance according to an MMSE scheme in a communication system supporting a MIMO scheme according to an embodiment of the present disclosure.

FIG. 15 is a graph illustrating performance of a method of determining an integer matrix A based on a representative channel value or a representative cost function, performance of a method of using an integer matrix A for each channel on symbol detection and using a common integer matrix A on decoding, and performance according to an MMSE scheme in a communication system supporting a MIMO scheme according to an embodiment of the present disclosure.

Performance for the following three methods under a condition of Rate-0.75 MLC & MSD (LDPC Coding), Channels: EPA 5 Hz, EVA 70 Hz, ETU 300 Hz Rayleigh Fading Channels (Carrier Freq.=2 GHz) is shown in FIG. 15.

In FIG. 15, performance for an MMSE scheme is shown as a graph labeled as "MMSE", performance for a method of determining an integer matrix A based on a representative channel value or a representative cost function, e.g., a method of using an integer matrix A which is determined based on a cost function average value according to an embodiment of the present disclosure is shown as a graph labeled as "IF w/AM Cost Func.", and performance for a method of using an integer matrix A for each channel on symbol detection and using a common integer matrix A on decoding, e.g., a method of using an integer matrix A optimal for each instant channel on symbol detection and using a common integer matrix A on decoding according to an embodiment of the present disclosure is shown as a graph labeled as "Adaptive-IF".

In FIG. 15, (a) indicates performance in a case that channel change is little. As shown in (a), it will be understood that performance of other two schemes is better than performance of an MMSE scheme in a case that a channel change is little.

As shown in (b), it will be understood that performance of the method of determining the integer matrix A based on the representative channel value or the representative cost function is similar to performance of the method of using the integer matrix A for each channel on symbol detection and using the common integer matrix A on decoding in a case that channel change amount is normal, and a difference between the performance and performance of an MMSE scheme is decreased compared to (a).

As shown in (c), it will be understood that performance according to the method of using the integer matrix A for each channel on symbol detection and using the common integer matrix A on decoding is significantly better than performance according to the method of determining the integer matrix A based on the representative channel value or the representative cost function and performance according the MMSE scheme in a case that a channel change is the greatest.

So, a method of using an integer matrix A for each channel on symbol detection and using a common integer matrix A on decoding according to an embodiment of the present disclosure can be the most suitable for a channel change, and a method of determining an integer matrix A based on a representative channel value or a representative cost function and an MMSE scheme can be selectively used according to channel change amount.

As is apparent from the foregoing description, an embodiment of the present disclosure enables to receive data in a communication system supporting a MIMO scheme.

An embodiment of the present disclosure enables to receive data based on an IF scheme in a communication system supporting a MIMO scheme.

An embodiment of the present disclosure enables to receive data based on a reception scheme which is adaptively selected in a communication system supporting a MIMO scheme.

An embodiment of the present disclosure enables to receive data based on channel change amount in a communication system supporting a MIMO scheme.

An embodiment of the present disclosure enables to effectively receive data based on an IF scheme in a communication system supporting a MIMO scheme in which a channel is changed on in a time and/or on a frequency.

An embodiment of the present disclosure enables to adaptively select a reception scheme suitable for channel change amount and receive data based on the selective reception scheme in a communication system supporting a MIMO scheme.

Certain aspects of the present disclosure can also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure can be implemented by a computer or a mobile terminal that includes a controller and a memory, and the memory can be an example of a non-transitory machine-readable (e.g., computer-readable), storage medium suitable to store a program or programs including instructions for implementing various embodiments of the present disclosure.

The present disclosure can include a program including code for implementing the apparatus and method as defined by the appended claims, and a non-transitory machine-readable (e.g., computer-readable), storage medium storing the program. The program can be electronically transferred via any media, such as communication signals, which are transmitted through wired and/or wireless connections, and the present disclosure can include their equivalents.

An apparatus according to an embodiment of the present disclosure can receive the program from a program providing device which is connected to the apparatus via a wire or a wireless and store the program. The program providing device can include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details can be made therein without departing from the spirit and scope of the present disclosure as defined by the appended claims and their equivalents.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for receiving data by a receiving apparatus in a communication system supporting a multiple input multiple output (MIMO) scheme, the method comprising:
    selecting one of a plurality of reception schemes; and
    receiving data based on the selected reception scheme,
    wherein the plurality of reception schemes includes a first integer forcing (IF) scheme and a second IF scheme,
    wherein the first IF scheme includes a scheme of determining an integer matrix based on channel values estimated for a plurality of channels, and decoding symbols received through the plurality of channels based on the determined integer matrix, and
    wherein the second IF scheme includes a scheme of detecting, for each channel, a sum of symbols received from each of the plurality of channels during a preset time based on integer matrixes which are determined based on each of the channel values, retransforming the sum of the symbols detected for each channel based on at least one of the integer matrixes, and decoding the retransformed sum of the symbols for each channel.

2. The method of claim 1, wherein the integer matrix used in the first IF scheme is determined based on at least one of an average value of the channel values and an average value of cost function values determined based on each of the channel values.

3. The method of claim 1, wherein selecting the one of the plurality of reception schemes comprises:
estimating channel change amount; and
selecting the first IF scheme if the channel change amount is less than or equal to a threshold value, or selecting the second IF scheme if the channel change amount is greater than the threshold value.

4. The method of claim 3, wherein estimating the channel change amount comprises estimating the channel change amount based on at least one of a location estimation value of the receiving apparatus, and a Doppler spread value and a delay spread value of the receiving apparatus.

5. The method of claim 1, wherein the plurality of reception schemes further includes a third IF scheme,
wherein the third IF scheme includes a scheme of receiving symbols from each of a plurality of groups which are generated by grouping the plurality of channels to decode the symbols,
wherein the plurality of groups are generated based on the channel values of the plurality of channels, and
wherein the received symbols are decoded based on an integer matrix which is based on a channel value of a corresponding group among the plurality of groups.

6. The method of claim 5, wherein channels included in each of the plurality of groups are channels through symbols which compose different codewords are transmitted.

7. The method of claim 6, wherein data rates of the plurality of groups are different.

8. The method of claim 5, wherein channels included in each of the plurality of groups are channels through symbols which compose a same codeword are transmitted.

9. The method of claim 8, wherein a number of the channels included in each of the plurality of groups is the same.

10. The method of claim 1, wherein a transmitting apparatus receives information about channel values estimated in the receiving apparatus and applies a pre-coding matrix corresponding to each of the plurality of channels such that same channel values are estimated in the receiving apparatus.

11. A receiving apparatus in a communication system supporting a multiple input multiple output (MIMO) scheme, the receiving apparatus comprising:
a receiver,
a processor configured to:
select one of a plurality of reception schemes, and
control the receiver to receive data based on the selected reception scheme,
wherein the plurality of reception schemes includes a first integer forcing (IF) scheme and a second IF scheme,
wherein the first IF scheme includes a scheme of determining an integer matrix based on channel values estimated for a plurality of channels, and decoding symbols received through the plurality of channels based on the determined integer matrix, and
wherein the second IF scheme includes a scheme of detecting, for each channel, a sum of symbols received from each of the plurality of channels during a preset time based on integer matrixes which are determined based on each of the channel values, retransforming the sum of the symbols detected for each channel based on at least one of the integer matrixes, and decoding the retransformed sum of the symbols for each channel.

12. The receiving apparatus of claim 11, wherein the integer matrix used in the first IF scheme is determined based on at least one of an average value of the channel values and an average value of cost function values determined based on each of the channel values.

13. The receiving apparatus of claim 11, wherein the processor is configured to:
estimate a channel change amount; and
select the first IF scheme if the channel change amount is less than or equal to a threshold value, or select the second IF scheme if the channel change amount is greater than the threshold value.

14. The receiving apparatus of claim 13, wherein the processor is configured to estimate the channel change amount based on at least one of a location estimation value of the receiving apparatus, and a Doppler spread value and a delay spread value of the receiving apparatus.

15. The receiving apparatus of claim 11, wherein the plurality of reception schemes further includes a third IF scheme,
wherein the third IF scheme includes a scheme of receiving symbols from each of a plurality of groups which are generated by grouping the plurality of channels to decode the symbols,
wherein the plurality of groups are generated based on the channel values of the plurality of channels, and
wherein the received symbols are decoded based on an integer matrix which is based on a channel value of a corresponding group among the plurality of groups.

16. The receiving apparatus of claim 15, wherein channels included in each of the plurality of groups are channels through symbols which compose different codewords are transmitted.

17. The receiving apparatus of claim 16, wherein data rates of the plurality of groups are different.

18. The receiving apparatus of claim 15, wherein channels included in each of the plurality of groups are channels through symbols which compose a same codeword are transmitted.

19. The receiving apparatus of claim 18, wherein a number of the channels included in each of the plurality of groups is the same.

20. The receiving apparatus of claim 11, wherein a transmitting apparatus receives information about channel values estimated in the receiving apparatus and applies a pre-coding matrix corresponding to each of the plurality of channels such that same channel values are estimated in the receiving apparatus.

* * * * *